(12) United States Patent
Koperski et al.

(10) Patent No.: US 9,116,995 B2
(45) Date of Patent: Aug. 25, 2015

(54) CLUSTER-BASED IDENTIFICATION OF NEWS STORIES

(75) Inventors: Krzysztof Koperski, Seattle, WA (US);
Satish Bhatti, Seattle, WA (US);
Jisheng Liang, Bellevue, WA (US);
Adrian Klein, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 250 days.

(21) Appl. No.: 13/434,600

(22) Filed: Mar. 29, 2012

(65) Prior Publication Data

US 2012/0254188 A1    Oct. 4, 2012

Related U.S. Application Data

(60) Provisional application No. 61/469,360, filed on Mar. 30, 2011.

(51) Int. Cl.
*G06F 7/00* (2006.01)
*G06F 17/30* (2006.01)

(52) U.S. Cl.
CPC ...... *G06F 17/30867* (2013.01); *G06F 17/3071* (2013.01); *G06F 17/30663* (2013.01); *G06F 17/30699* (2013.01); *G06F 17/30705* (2013.01); *G06F 17/30707* (2013.01); *G06F 17/30722* (2013.01)

(58) Field of Classification Search
None
See application file for complete search history.

(56) References Cited

U.S. PATENT DOCUMENTS

| | | | |
|---|---|---|---|
| 4,839,853 A | 6/1989 | Deerwester et al. | 364/900 |
| 5,301,109 A | 4/1994 | Landauer et al. | 364/419.19 |
| 5,317,507 A | 5/1994 | Gallant | 364/419.13 |
| 5,325,298 A | 6/1994 | Gallant | 364/419.19 |
| 5,331,556 A | 7/1994 | Black, Jr. et al. | 364/419.08 |
| 5,377,103 A | 12/1994 | Lamberti et al. | 364/419.08 |

(Continued)

FOREIGN PATENT DOCUMENTS

| | | |
|---|---|---|
| EP | 0 280 866 | 9/1988 |
| EP | 0 597 630 | 7/2002 |

(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — Loan T Nguyen
(74) *Attorney, Agent, or Firm* — Ellen M. Bierman; Lowe Graham Jones PLLC

(57) ABSTRACT

Methods, systems, and techniques for cluster-based content recommendation are described. Some embodiments provide a content recommendation system ("CRS") configured to recommend news stories about events or occurrences. In some embodiments, a news story about an event includes multiple related content items that each include an account of the event and that each reference one or more entities or categories that are represented by the CRS. In one embodiment, the CRS identifies news stories by generating clusters of related content items. Then, in response to a received query that indicates a keyterm, entity, or category, the CRS determines and provides indications of one or more news stories that are relevant to the received query. In some embodiments, at least some of these techniques are employed to implement a news story recommendation facility in an online news service.

21 Claims, 15 Drawing Sheets

(56) References Cited

U.S. PATENT DOCUMENTS

| | | | |
|---|---|---|---|
| 5,619,709 A | 4/1997 | Caid et al. ..................... 395/794 |
| 5,634,051 A | 5/1997 | Thomson |
| 5,778,362 A | 7/1998 | Deerwester ....................... 707/5 |
| 5,794,050 A | 8/1998 | Dahlgren et al. ............. 395/708 |
| 5,794,178 A | 8/1998 | Caid et al. ......................... 704/9 |
| 5,799,268 A | 8/1998 | Boguraev ........................... 704/9 |
| 5,848,417 A | 12/1998 | Shoji et al. .................... 707/102 |
| 5,857,179 A | 1/1999 | Vaithyanathan et al. ......... 707/2 |
| 5,884,302 A | 3/1999 | Ho ..................................... 707/3 |
| 5,933,822 A | 8/1999 | Braden-Harder et al. ........ 707/5 |
| 5,950,189 A | 9/1999 | Cohen et al. ...................... 707/3 |
| 5,982,370 A | 11/1999 | Kamper ......................... 345/356 |
| 6,006,221 A | 12/1999 | Liddy et al. ....................... 707/5 |
| 6,006,225 A | 12/1999 | Bowman et al. .................. 705/5 |
| 6,026,388 A | 2/2000 | Liddy et al. ....................... 707/1 |
| 6,061,675 A | 5/2000 | Wical .............................. 706/45 |
| 6,064,951 A | 5/2000 | Park et al. .......................... 704/8 |
| 6,122,647 A | 9/2000 | Horowitz et al. ............. 707/513 |
| 6,185,550 B1 | 2/2001 | Snow et al. ........................ 707/1 |
| 6,192,360 B1 | 2/2001 | Dumais et al. .................... 707/6 |
| 6,202,064 B1 | 3/2001 | Julliard ............................. 707/5 |
| 6,219,664 B1 | 4/2001 | Watanabe .......................... 707/3 |
| 6,246,977 B1 | 6/2001 | Messerly et al. .................. 704/9 |
| 6,311,152 B1 | 10/2001 | Bai et al. ............................ 704/9 |
| 6,363,373 B1 | 3/2002 | Steinkraus ........................ 707/3 |
| 6,405,190 B1 | 6/2002 | Conklin ............................ 707/3 |
| 6,411,962 B1 | 6/2002 | Kupiec |
| 6,460,029 B1 | 10/2002 | Fries et al. |
| 6,484,162 B1 | 11/2002 | Edlund et al. |
| 6,510,406 B1 | 1/2003 | Marchisio |
| 6,571,236 B1 | 5/2003 | Ruppelt ............................ 707/3 |
| 6,584,464 B1 | 6/2003 | Warthen |
| 6,601,026 B2 | 7/2003 | Appelt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,745,161 B1 | 6/2004 | Arnold et al. ..................... 704/7 |
| 6,757,646 B2 | 6/2004 | Marchisio ......................... 704/8 |
| 6,859,800 B1 | 2/2005 | Roche et al. ...................... 707/3 |
| 6,862,710 B1 | 3/2005 | Marchisio .................... 715/501.1 |
| 6,910,003 B1 | 6/2005 | Arnold et al. ..................... 704/4 |
| 6,996,575 B2 | 2/2006 | Cox et al. ....................... 707/102 |
| 7,051,017 B2 | 5/2006 | Marchisio ......................... 707/3 |
| 7,054,854 B1 | 5/2006 | Hattori et al. ..................... 707/3 |
| 7,171,349 B1 | 1/2007 | Wakefield et al. ................ 704/9 |
| 7,283,951 B2 | 10/2007 | Marchisio et al. ................ 704/9 |
| 7,398,201 B2 * | 7/2008 | Marchisio et al. ................ 704/9 |
| 7,403,938 B2 | 7/2008 | Harrison et al. .................. 707/3 |
| 7,451,135 B2 | 11/2008 | Goldman et al. |
| 7,526,425 B2 | 4/2009 | Marchisio et al. ................ 704/9 |
| 7,672,833 B2 | 3/2010 | Blume et al. .................... 704/10 |
| 7,720,870 B2 * | 5/2010 | Barbosa et al. ................ 707/796 |
| 7,788,084 B2 | 8/2010 | Brun et al. |
| 8,122,016 B1 | 2/2012 | Lamba et al. |
| 8,122,026 B1 | 2/2012 | Laroco, Jr. et al. ............ 707/737 |
| 8,612,866 B2 * | 12/2013 | Miyazaki et al. ............. 715/747 |
| 2002/0007267 A1 | 1/2002 | Batchilo et al. ................... 704/9 |
| 2002/0010574 A1 | 1/2002 | Tsourikov et al. ................ 704/9 |
| 2002/0022956 A1 * | 2/2002 | Ukrainczyk et al. ............. 704/9 |
| 2002/0059161 A1 | 5/2002 | Li ....................................... 707/1 |
| 2002/0078041 A1 | 6/2002 | Wu ..................................... 707/4 |
| 2002/0078045 A1 | 6/2002 | Dutta |
| 2002/0091671 A1 | 7/2002 | Prokoph ............................ 707/1 |
| 2002/0103789 A1 | 8/2002 | Turnbull et al. ................... 707/3 |
| 2002/0120651 A1 | 8/2002 | Pustejovsky et al. |
| 2002/0156763 A1 | 10/2002 | Marchisio ......................... 707/1 |
| 2003/0004716 A1 | 1/2003 | Haigh et al. .................... 704/238 |
| 2003/0101182 A1 | 5/2003 | Govrin et al. ..................... 707/7 |
| 2003/0115065 A1 | 6/2003 | Kakivaya et al. ........... 704/270.1 |
| 2003/0115191 A1 | 6/2003 | Copperman et al. ............. 707/3 |
| 2003/0233224 A1 | 12/2003 | Marchisio et al. ................ 704/4 |
| 2004/0010508 A1 | 1/2004 | Fest et al. |
| 2004/0044669 A1 | 3/2004 | Brown et al. |
| 2004/0064447 A1 | 4/2004 | Simske et al. ..................... 707/5 |
| 2004/0103090 A1 | 5/2004 | Dogl et al. ......................... 707/3 |
| 2004/0125877 A1 | 7/2004 | Chang et al. .............. 375/240.28 |
| 2004/0167870 A1 | 8/2004 | Wakefield et al. ................ 707/1 |
| 2004/0167883 A1 | 8/2004 | Wakefield et al. ................ 707/3 |
| 2004/0167884 A1 | 8/2004 | Wakefield et al. ................ 707/3 |
| 2004/0167885 A1 | 8/2004 | Wakefield et al. ................ 707/3 |
| 2004/0167886 A1 | 8/2004 | Wakefield et al. ................ 707/3 |
| 2004/0167887 A1 | 8/2004 | Wakefield et al. ................ 707/3 |
| 2004/0167907 A1 | 8/2004 | Wakefield et al. ............ 707/100 |
| 2004/0167908 A1 | 8/2004 | Wakefield et al. ............ 707/100 |
| 2004/0167909 A1 | 8/2004 | Wakefield et al. ............ 707/100 |
| 2004/0167910 A1 | 8/2004 | Wakefield et al. ............ 707/100 |
| 2004/0167911 A1 | 8/2004 | Wakefield et al. ............ 707/100 |
| 2004/0221235 A1 | 11/2004 | Marchisio et al. ............ 715/534 |
| 2004/0243388 A1 | 12/2004 | Corman et al. .................... 704/1 |
| 2005/0027704 A1 | 2/2005 | Hammond et al. ............... 707/5 |
| 2005/0076365 A1 | 4/2005 | Popov et al. |
| 2005/0108001 A1 | 5/2005 | Aarskog ......................... 704/10 |
| 2005/0108262 A1 | 5/2005 | Fawcett, Jr. et al. |
| 2005/0138018 A1 | 6/2005 | Sakai et al. ........................ 707/3 |
| 2005/0144064 A1 | 6/2005 | Calabria et al. ................. 705/14 |
| 2005/0149473 A1 * | 7/2005 | Weare ................................ 707/1 |
| 2005/0149494 A1 | 7/2005 | Lindh et al. ....................... 707/3 |
| 2005/0177805 A1 | 8/2005 | Lynch et al. ................... 715/968 |
| 2005/0197828 A1 | 9/2005 | McConnell et al. .............. 704/9 |
| 2005/0210000 A1 | 9/2005 | Michard ............................ 707/3 |
| 2005/0216443 A1 | 9/2005 | Morton et al. .................... 707/3 |
| 2005/0267871 A1 | 12/2005 | Marchisio et al. ................ 707/3 |
| 2006/0149734 A1 | 7/2006 | Egnor et al. ....................... 707/7 |
| 2006/0279799 A1 | 12/2006 | Goldman |
| 2007/0067285 A1 | 3/2007 | Blume et al. ...................... 707/5 |
| 2007/0143300 A1 | 6/2007 | Gulli et al. |
| 2007/0156669 A1 | 7/2007 | Marchisio et al. |
| 2007/0209013 A1 | 9/2007 | Ramsey et al. ............... 715/769 |
| 2008/0005651 A1 | 1/2008 | Grefenstette et al. ......... 715/500 |
| 2008/0010270 A1 | 1/2008 | Gross ................................. 707/5 |
| 2008/0059456 A1 | 3/2008 | Chowdhury et al. ............. 707/5 |
| 2008/0082578 A1 | 4/2008 | Hogue et al. ................ 707/104.1 |
| 2008/0097975 A1 | 4/2008 | Guay et al. ........................ 707/4 |
| 2008/0097985 A1 | 4/2008 | Olstad et al. |
| 2008/0235203 A1 | 9/2008 | Case et al. |
| 2008/0288456 A1 | 11/2008 | Omoigui ........................... 707/3 |
| 2009/0076886 A1 | 3/2009 | Dulitz et al. .................... 705/10 |
| 2009/0144609 A1 * | 6/2009 | Liang et al. ................... 715/230 |
| 2009/0228439 A1 | 9/2009 | Manolescu et al. .............. 707/3 |
| 2009/0248678 A1 * | 10/2009 | Okamoto et al. ................. 707/5 |
| 2010/0010994 A1 | 1/2010 | Wittig et al. |
| 2010/0046842 A1 | 2/2010 | Conwell ....................... 382/218 |
| 2010/0048242 A1 | 2/2010 | Rhoads et al. .............. 455/556.1 |
| 2010/0250497 A1 | 9/2010 | Redlich et al. ................ 707/661 |
| 2010/0281025 A1 * | 11/2010 | Tsatsou et al. ................ 707/733 |
| 2011/0173194 A1 * | 7/2011 | Sloo et al. ..................... 707/736 |
| 2013/0124510 A1 | 5/2013 | Guha |

FOREIGN PATENT DOCUMENTS

| | | |
|---|---|---|
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 03/017143 | 2/2003 |
| WO | WO 2004/053645 | 6/2004 |
| WO | WO 2004/114163 | 12/2004 |
| WO | WO 2006/068872 | 6/2006 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

(56) References Cited

OTHER PUBLICATIONS

Jayapandian et al., "Automating the Design and Construction of Query Forms," Data Engineering, Proceedings of the 22$^{nd}$ International Conference IEEE, Atlanta, Georgia, Apr. 3, 2006, pp. 125-127.
Kaiser, "Ginsen—A Natural Language User Interface for Semantic Web Search," University of Zurich, Sep. 16, 2004, URL=http://www.ifi.unizh.ch/archive/mastertheses/DA__Arbeiten__2004/Kaiser__Christian.pdf, pp. 1-84.
Liang et al., "Extracting Statistical Data Frames from Text," SIGKDD Explorations, Jun. 2005. vol. 7, No. 1, pp. 67-75.
Littman et al., "Automatic Cross-Language Information Retrieval using Latent Semantic Indexing," In *Grefenstette, G.*, editor, Cross Language Information Retrieval. Kluwer, 1998.
Nagao et al., "Semantic Annotation and Transcoding: Making Web Content More Accessible," *IEEE Multimedia, IEEE Computer Society*, US. 8(2):69-81, Apr. 2001.
Nguyen et al., "Accessing Relational Databases from the World Wide Web," SIGMOD Record. ACM USA, Jun. 1996, vol. 25, No. 2, pp. 529-540.
Pohlmann et al., "The Effect of Syntactic Phrase Indexing on Retrieval Performance for Dutch Texts," Proceedings of RIAO, pp. 176-187, Jun. 1997.
Rasmussen, "WDB—A Web Interface to Sybase," Astronomical Society of the Pacific Conference Series, Astron. Soc. Pacific USA, 1995, vol. 77, pp. 72-75.
Sneiders, "Automated Question Answering Using Question Templates That Cover the Conceptual Model of the Database," Natural Language Processing and Information Systems, 6$^{th}$ International Conference on Applications of Natural Language to Information Systems, Revised Papers (Lecture Notes in Computer Science vol. 2553), Springer-Verlag, Berlin, Germany, 2002, vol. 2553, pp. 235-239.
Ruiz-Casado et al., "From Wikipedia to Semantic Relationships: A Semi-Automated Annotation Approach", 2006, pp. 1-14.
Florian et al., "Named Entity Recognition through Classifier Combination", 2003, IBM T.J. Watson Research Center, pp. 168-171.
Dekai Wu, A Stacked, Voted, Stacked Model for Named Entity Recognition, 2003, pp. 1-4.
Google, "How to Interpret Your Search Results", http://web.archive.org/web/20011116075703/http://www.google.com/intl/en/help/interpret.html, Mar. 27, 2001; 6 pages.
Razvan Bunescu et al., "Using Encyclopedic Knowledge for Named Entity Disambiguation", 2006, Google, pp. 9-16.
Silviu Cucerzan, "Large-Scale Named Entity Disambiguation Based on Wikipedia Data", Proceedings of the 2007 Joint Conference on Empirical Methods in Natural Language Processing and Computational Natural Language Learning, pp. 708-716, Prague, Jun. 2007.
Razvan Constantin Bunescu, "Learning for Information Extraction: From Named Entity Recognition and Disambiguation to Relation Extraction" The Dissertation Committee for Aug. 2007, The University of Texas at Austin, pp. 1-150.
Joseph Hassell et al., "Ontology-Driven Automatic Entity Disambiguation in Unstructured Text" Large Scale Distributed Information Systems (LSDIS) Lab Computer Science Department, University of Georgia, Athens, GA 30602-7404, ISWC 2006, LNCS 4273, pp. 44-57.
Levon Lloyd et al. "Disambiguation of References to Individuals" IBM Research Report, Oct. 28, 2005, pp. 1-9.
Dhillon et al., "Refining Clusters in High Dimensional Text Data," 2002.
Perone, Christian, Machine Learning:: Cosine Similarity for Vector Space Models (Part III), Pyevolve. sourceforge.net/wordpress/?p=2497, Sep. 12, 2013.

\* cited by examiner

```
<entity id="301240" href="/organization/new-orleans-hornets-0x498b8">
  <facets>
    <facet lookupName="basketball_team" count="170609">
      <name>Basketball Team</name>
      <taxonomicPaths>
        <taxonomicPath>Evri/Organization/Sports/Basketball_Team</taxonomicPath>
      </taxonomicPaths>
    </facet>
  </facets>
  <name>New Orleans Hornets</name>
  <properties>
    <property displayName="City">
      <name>location_city</name>
      <value>New Orleans, Louisiana</value></property>
    <property displayName="Owned by">
      <name>owner</name><value>Gary Chouest</value></property>
    <property displayName="Owned by">
      <name>owner</name><value>George Shinn</value></property>
    ...
  </properties>
  <type>ORGANIZATION</type>
</entity>
```

*Fig. 4A*

Chouest Remains Interested in Hornets

Outgoing Hornets minority owner Gary Chouest says he remains as interested in keeping the NBA in New Orleans as he was when he first invested in the club. Chouest attended Friday night's home game against Oklahoma City and says the reason he bought into in the Hornets "hasn't changed from Day 1."

A Louisiana native whose company supplies vessels to the offshore energy industry, Chouest became a part owner when the Hornets returned to New Orleans from Oklahoma City in 2007. Last spring he neared a deal to take full control, but negotiations with majority owner George Shinn stalled, and Chouest won't comment on why.

The NBA is now purchasing 100 percent of the team pending approval by the league's board of governors.

*Fig. 4B*

| Term | TF-IDF | Entity ID | Term Frequency |
|---|---|---|---|
| gary chouest | 47.6 | null | 12 |
| new orleans hornets | 47.0 | 301240 | 7 |
| interested | 26.3 | null | 4.7 |
| new orleans | 19.2 | 301260 | 4 |
| national basketball association | 18.1 | 312923 | 4 |
| invested | 17.9 | null | 2.8 |
| owner | 13.8 | null | 5 |
| ... | | | |
| oklahoma city | 12.8 | 330452 | 2 |
| ... | | | |

Fig. 4C

| Entity / Keyterm | Stories |
|---|---|
| natalie portman | {(A, 0.0), (B, 0.7), (C, 0.1)} |
| new orleans hornets | {(A, 0.8), (B, 0.1), (C, 0.0)} |
| black swan movie | {(A, 0.0), (B, 0.5), (C, 0.0)} |
| new orleans | {(A, 0.5), (B, 0.0), (C, 0.0)} |
| national basketball association | {(A, 0.6), (B, 0.0), (C, 0.0)} |
| boston | {(A, 0.0), (B, 0.0), (C, 0.6)} |
| new york | {(A, 0.0), (B, 0.2), (C, 0.7)} |
| kennedy airport | {(A, 0.0), (B, 0.0), (C, 0.8)} |

Fig. 4F

CLUSTER-BASED IDENTIFICATION OF NEWS STORIES

TECHNICAL FIELD

The present disclosure relates to methods, techniques, and systems for identifying and recommending news stories and, more particularly, to methods, techniques, and systems for identifying news stories by generating clusters of related content items, such as news articles, that share common aspects, including keyterms, entities, and/or categories.

BACKGROUND

Various approaches to providing computer-generated news Web sites exist. One approach aggregates article headlines from news sources worldwide, and groups similar articles together based upon shared keywords. In some cases, the articles may be grouped into a handful of broad, statically defined categories, such as Business, Sports, Entertainment, and the like. Such approaches may not be effective at grouping articles that are related to more fine-grained concepts, such as individual people or specific events.

Other approaches may use traditional clustering algorithms, such as k-means or hierarchical clustering, to group articles based on keywords. Typically, a k-means approach will group articles into a predetermined number of clusters. In the news context, it may be difficult to determine the correct number of clusters a priori. Thus, the k-means approach may yield clusters that are over-inclusive, in that a cluster may include articles that are not particularly relevant to an event described by other articles in the cluster. Similarly, k-means may yield clusters that are under-inclusive, in that a cluster may exclude an article that is relevant to an event described by other articles in the cluster. Alternatively, hierarchical clustering approaches may be used to determine and present a hierarchy of articles. As with k-means clustering, some clusters generated by hierarchical techniques will be under- or over-inclusive. For example, clusters near the top of the hierarchy will tend to include many articles that have little to do with one another. Similarly, clusters near the bottom of the hierarchy will tend to leave out potentially relevant articles.

BRIEF DESCRIPTION OF THE DRAWINGS

FIGS. 4A-4F illustrate example data processed, utilized, or generated by an example embodiment of a content recommendation system.

DETAILED DESCRIPTION

Figure 1:
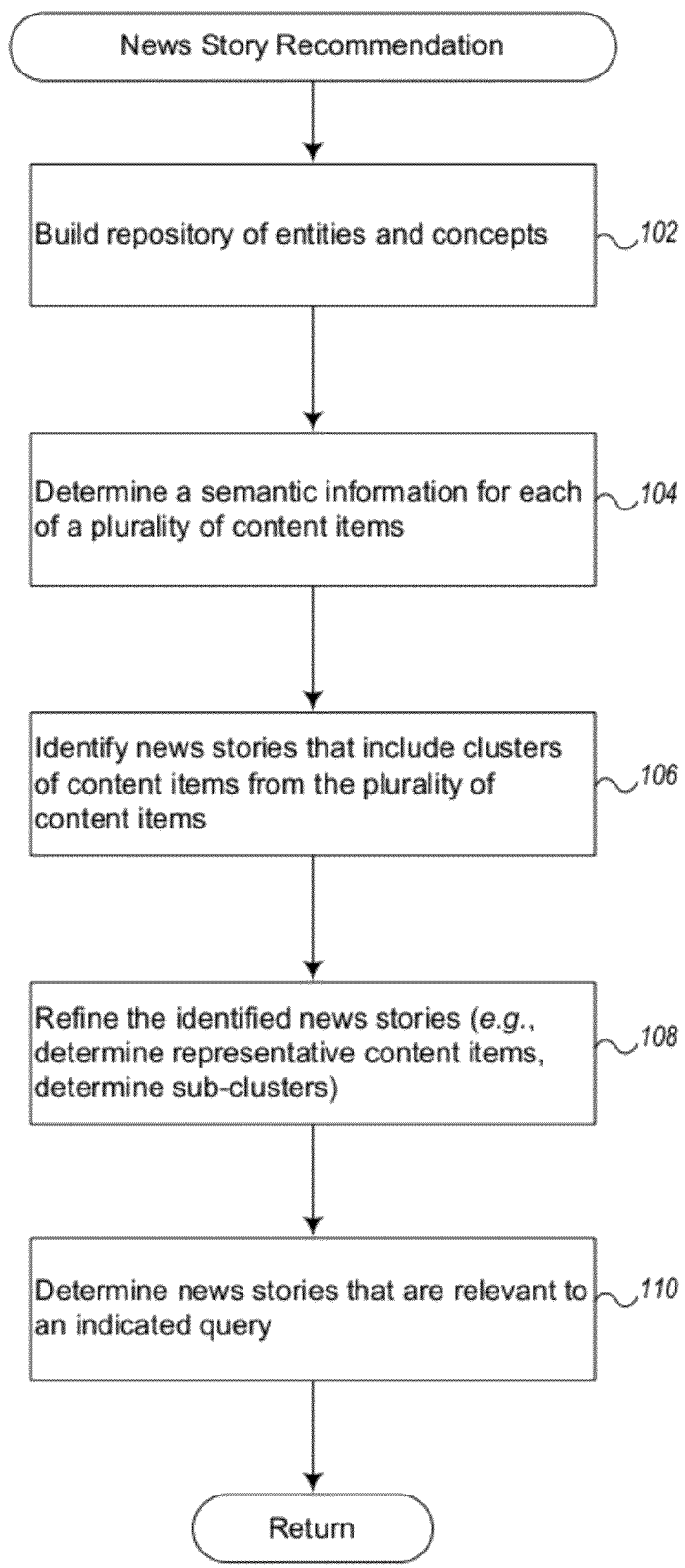
FIG. 1 is an example flow diagram of a news story recommendation process performed by an example embodiment of a content recommendation system.

Embodiments described herein provide enhanced computer- and network-based methods and systems for recommending content and more particularly, identifying and recommending news stories (herein sometimes referred to as "stories") that include clusters (e.g., groups, collections, sets) of content items that share common keyterms, entities, and/or categories. Example embodiments provide a content recommendation system ("CRS") configured to recommend content items such as articles, documents, videos, advertisements, product information, software applications/modules, and the like. In some embodiments, the CRS is configured to organize the content items it recommends by grouping content items obtained from different sources into a story. A story may be, include, or represent an event or occurrence, as described by a plurality of news items (e.g., text articles, video programs, audio clips) published or provided by possibly different sources (e.g., online newspapers, blogs, magazines). An example story may be President Obama's inauguration as told or described by multiple distinct news items, such as newspaper articles published by the New York Times and The Washington Post, video clips of the inauguration parade or speech provided by CNN or other network, an audio clip from a local radio station broadcast, a Blog post from a political blogger or attendee, and the like. The CRS may generate and store a representation of the story of President Obama's inauguration, the story representation including indicators of multiple news items that each give an account of the inauguration.

The CRS may automatically identify news stories by processing content items and grouping or clustering content items based on common aspects between the clustered items. In one embodiment, identifying news stories includes automatically generating or determining content clusters that each include multiple content items that are similar to one another, such as by including or referencing common keyterms, entities, categories, and/or other concepts. In some embodiments, the CRS includes a semantic network, graph, ontology or other representation(s) of entities, categories, or concepts. The identification of news stories may be based at least in part on the entities, categories, or concepts referenced by content items. Entities may include people, places (e.g., locations), organizations (e.g., political parties, corporations, groups), events, concepts, products, substances, and the like. Entities may further be associated with (e.g., related to) one or more categories (also called "facets"). Example facets include actor, politician, athlete, nation, drug, sport, automobile, and the like. Tables 1 and 2, below, respectively include a list of example entity types and a list of example categories/facets. A greater or lesser number of entity types or categories may be available. The CRS may further determine and store semantic information about content items, including identifying entities, relations, and/or categories that are referenced (e.g., named, described) by those content items. The semantic information may thus include identified identities, relations between identified entities, categories, or the like. The CRS then determines news stories by grouping news items that reference common keyterms, entities, categories or other concepts. The multiple content items of a story will typically each give an account of the story.

In some embodiments, the CRS provides a search and discovery facility that is configured to recommend news stories that match a received search query. First, the CRS may identify news stories that include clusters of content items that are similar or related to one another, as described herein. Then, the CRS may receive (e.g., via a Web-based search interface, via an API call) a search query that indicates a keyterm, entity, or category. In response, the CRS determines (e.g., finds, selects, obtains, identifies) one or more news stories that include content items that match the received query, such as by referencing the indicated keyterm, entity, or category. The CRS may then rank or order the selected news stories, such that more relevant news stories appear before less relevant stories. The CRS then provides indications of the selected and ranked stories, such as by storing, transmitting, or forwarding the selected stories.

1. Overview of News Story Recommendation in One Embodiment

FIG. 1 is an example flow diagram of a news story recommendation process performed by an example embodiment of a content recommendation system. In particular, FIG. 1 illustrates a process that may be implemented by and/or performed by an example content recommendation system. The process automatically identifies and recommends news stories that include clusters of content items relevant to a specified keyterm, entity, or category.

The process begins at block 102, where it builds a repository of entities and concepts. In one embodiment, building the repository may include automatically identifying entities by processing structured or semi-structured data, such as may be obtained Wikipedia, Techcrunch, or other public or private data repositories, knowledge bases, news feeds, and the like. In other embodiments, unstructured text documents or other content items (e.g., audio data) may be processed to identify entities. Entities may be stored or represented electronically, such as shown and described with respect to FIG. 4A. As noted above, entities may be organized into taxonomic hierarchies, based on taxonomic relations such as is-a, part-of, member-of, and the like. In some embodiments, the entities are also associated with properties. Taxonomic paths and/or properties may be extracted from structured and semi-structured sources (e.g., Wikipedia). An example taxonomic hierarchy is illustrated with respect to FIG. 4D.

At block 104, the process determines semantic information for each of a plurality of content items. An example content item (e.g., news item or article) is shown with respect to FIG. 4B. Determining semantic information may include determining a ranked list of entities for each content item. In some embodiments, the process uses entity tagging and disambiguation to link references to entities that occur in the text of a content item to entries in the repository of entities and concepts generated at block 102. Then, for each content item, the process determines a ranked list of entities, ordered by their importance and relevance to the main subject/topic of the content item. This information may be stored as shown and described with respect to FIG. 4C, below. For content items that are primarily non-textual (e.g., audio and/or video items), semantic information may be determined by processing ancillary information, such as closed captions, subtitles, or meta-information. Meta-information may include descriptive or catalog information, such as authors, titles, producers, actors, abstracts, descriptions, summaries, reviews, or the like.

Determining semantic information may also include determining and/or assigning categories to each content item of the plurality of content items, based on the ranked list of entities determined at block 104. The categories may be or include any node or path in a semantic network and/or a taxonomic graph, or any properties that may be shared by a group of entities (e.g., Pac-10 conference teams, University of Washington Huskies football players, left-handed baseball pitchers, rookie football quarterbacks). The assigned categories may be based on groups of entities or entity types, grouped based on their taxonomic paths and/or any selected properties. Assigning categories to a content item may further include storing the determined categories in an inverted index or other type of data structure for efficient retrieval at a later time.

At block 106, the process identifies news stories that each include a cluster of related content items from the plurality of content items. Identifying a news story may include generating a cluster of content items that are related to one another in that they have one or more keyterms, entities, and/or categories in common. An example process for generating content clusters is described with respect to FIG. 7.

At block 108, the process refines the identified news stories. Refining an identified news story may generally include determining additional information about or related to a news story. In some embodiments, refining a news story includes identifying a representative content item for the news story. For example, the process may select a content item that most closely matches the "average" of the content items in the news story. In other embodiments, refining a news story includes determining multiple sub-clusters or sub-stories for the news story. Refining an identified news story may include determining a representative image, one or more main categories, publication times, number of content items, growth factor, and the like.

At block 110, the process determines news stories that are relevant to an indicated query. In one embodiment, the CRS provides a search engine facility that can answer queries requesting information about content items related to one or more specified keyterms, entities, and/or categories. Thus, determining relevant news stories may include finding news stories that include content items that match or are otherwise related to at least one of the specified elements (e.g., keyterms, entities, categories) of the received query. The determined news stories may be ranked by factors such as source credibility, popularity of the topic, recency, or the like. The determined news stories may then be provided (e.g., transmitted, sent, forwarded, stored), such as in response to a received search query or other request.

2. Functional Elements of an Example Content Recommendation System

Figure 2:
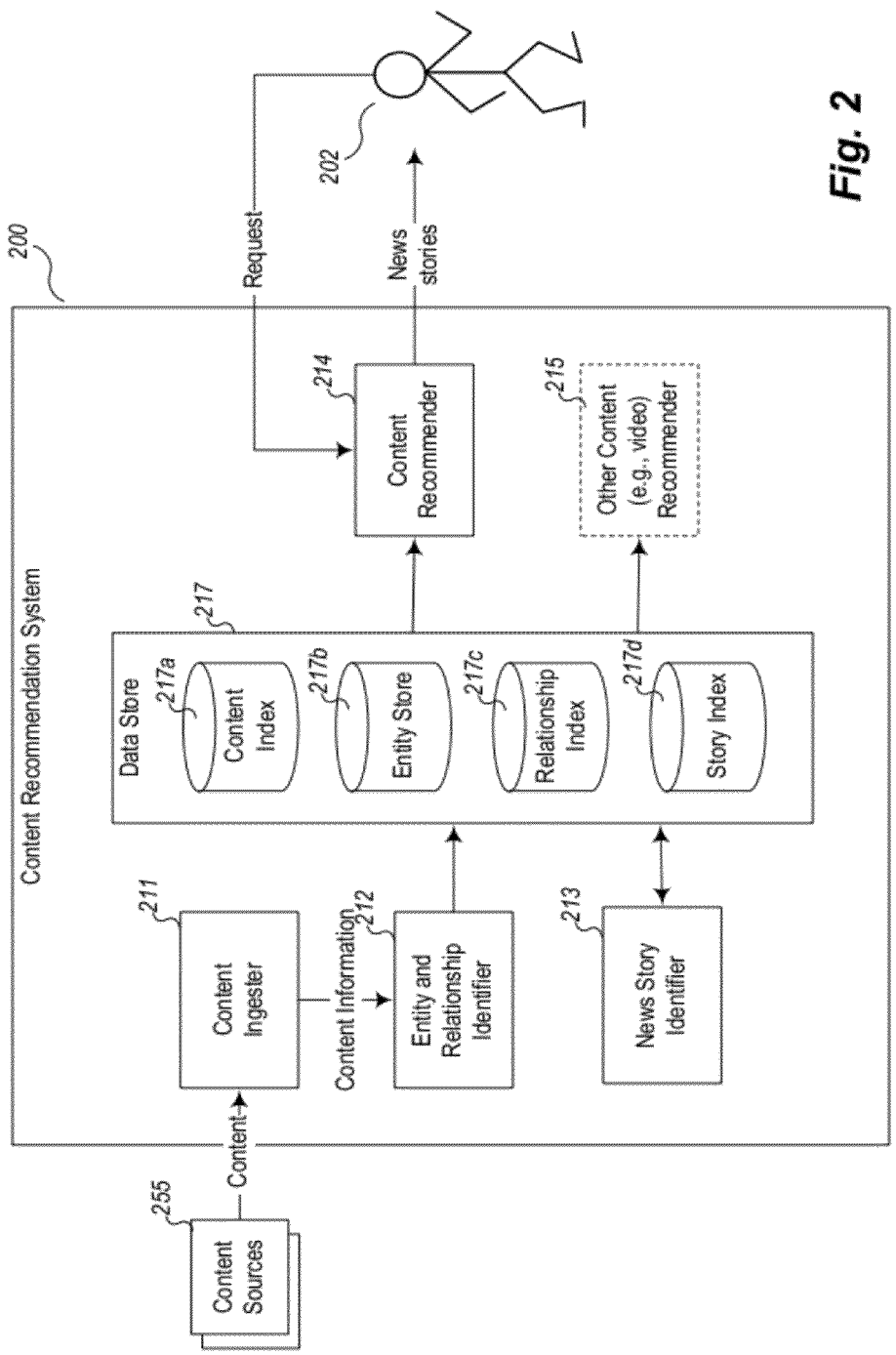
FIG. 2 illustrates an example block diagram of an example embodiment of a content recommendation system.

FIG. 2 illustrates an example block diagram of an example embodiment of a content recommendation system. In particular, FIG. 2 illustrates a content recommendation system ("CRS") 200 that includes a content ingester 211, an entity and relationship identifier 212, a news story identifier 213, a content recommender 214, an optional other content recommender 215, and a data store 217. The data store 217 includes a content index 217a, an entity store 217b, a relationship index 217c, and a story index 217d.

The content ingester 211 receives and indexes content from various content sources 255, including sources such as Web sites, Blogs, news feeds, video feeds, and the like. The content ingester 211 may also receive content from non-public or semi-public sources, including subscription-based information services, access-controlled social networks, and the like. The content ingester 211 provides content information, including data included within content items (e.g., text, images, video) and meta-data about content items (e.g., author, title, date, source), to the entity and relationship identifier 212. The content information may be provided directly (as illustrated) and/or via some intermediary, such as the content index 217a.

The entity and relationship identifier 212 determines semantic information about content items obtained from the various content sources 255, and stores the determined information in the data store 217. More specifically, the entity and relationship identifier 212 receives content information from the content ingester 211 and identifies entities and relationships that are referenced therein. Various automatic and semi-automatic techniques are contemplated for identifying entities within content items. In one embodiment, the identifier 212 uses natural language processing techniques, such as parts of speech tagging and relationship searching, to identify sentence components such as subjects, verbs, and objects, and to identify and disambiguate entities. Example relationship searching technology, which uses natural language processing to determine relationships between subjects and objects in ingested content, is described in detail in U.S. Pat. No. 7,526,425, filed Dec. 13, 2004, and entitled "METHOD AND SYSTEM FOR EXTENDING KEYWORD SEARCHING FOR SYNTACTICALLY AND SEMANTICALLY ANNOTATED DATA" issued on Apr. 28, 2009, and example entity recognition and disambiguation technology is described in detail in U.S. patent application Ser. No. 12/288,158, filed Oct. 15, 2008, and entitled "NLP-BASED ENTITY RECOGNITION AND DISAMBIGUATION," both of which are incorporated herein by reference in their entireties. Amongst other capabilities, the use of relationship searching, enables the CRS 200 to establish second order (or greater order) relationships between entities and to store such information in the data store 217.

For example, given a sentence such as "Sean Connery starred in Goldfinger," the identifier 212 may identify "Sean Connery" as the sentence subject, "starred" as the sentence verb (or action), and "Goldfinger" as the sentence object, along with the various modifiers present in the sentence. These parts-of-speech components of each sentence, along with their grammatical roles and other tags may be stored (e.g., indexed) in the entity index 217b, for example as an inverted index as described in U.S. Pat. No. 7,526,425. As part of the indexing process, the CRS recognizes and disambiguates entities that are present in the text. Indications of these disambiguated entities are also stored with the sentence information, when the sentence contains uniquely identifiable entities that the CRS already knows about. These entities are those that have been added previously to the entity store 217b. In some cases, the indexed text contains subjects and objects that indicate entities that are not necessarily known or not yet disambiguated entities. In this case the indexing of the sentence may store as much information as it has in relationship index 217c, but may not refer to a unique identifier of an entity in the entity store 217b. Over time, as the CRS encounters new entities, and in some cases with the aid of manual curation, new entities are added to the entity store 217b. In the above example, "Sean Connery" and "Goldfinger" may be unique entities already known to the CRS and present in the entity store 217b. In this case, their identifiers will be stored along with the sentence information in the relationship index 217c. The identified verbs also define relationships between the identified entities. These defined relationships (e.g., stored as subject-action-object or "SAO" triplets, or otherwise) are then stored in the relationship index 217c. In the above example, a representation of the fact that the actor Sean Connery starred in the film Goldfinger would be added to the relationship index 217c. In some embodiments, the process of identifying entities may be at least in part manual. For example, entities may be provisionally identified by the identifier 212, and then submitted to curators (or other humans) for editing, finalization, review, and/or approval.

The content index 217a associates content items with one or more entities and categories, and vice versa, in order to support efficient searches such as searches for content items having a particular entity or for categories associated with a particular content item. For example, given an entity or category, the CRS 200 may provide a list of content items that reference that entity or category. In addition, given an indication of a content item, the CRS may provide a list of entities or categories referenced by that content item.

The entity store 217b is a repository of entities (e.g., people, organization, place names, products, events, things), concepts, and other semantic information. An example structure for representing an entity is described with respect to FIG. 4A. In at least some embodiments, the entities in the entity store 217b are related such that they form a semantic network, taxonomy, or graph. The entities in the entity store 217b are associated with categories/facets. The categories themselves are organized into one or more taxonomies based on taxonomic relations such as is-a, part-of, member-of, and the like. An example taxonomic hierarchy is described with respect to FIG. 4D. In addition, entities are associated with certain properties, such as name and aliases, a unique identifier, types and facets, descriptions, and the like.

Entities may also have type/facet-specific properties. For example, for a sports athlete, common properties may include: birth place, birth date, sports teams, player positions, awards, and the like. Note that some of the properties are relational, that is, the property value may itself be another entity in the entity store 217b. For example, the team property for an athlete may be link to a sports team entity in the entity store 217b, and vice versa. Thus, the entities in the entity store 217b are interconnected through the property links, creating a semantic network or graph. Certain taxonomic relations are represented as such property links (e.g., the "member-of" relation for the players-team relation, and team-league relation in the sports domain). In some embodiments, the entities, their taxonomic paths and/or properties are extracted from one or more structured and semi-structured sources (e.g., Wikipedia). In other embodiments, the process of identifying entities may be at least in part manual. For example, entities may be provisionally identified by the content ingester 211, and then submitted to humans for editing, finalization, review, and/or approval.

The news story identifier 213 identifies news stories that include content items known to the CRS 200. In some embodiments, identifying a news story may include generating a cluster of related content items, such that the content items in the cluster reference or describe common keyterms, entities, categories, and/or other concepts. The news story identifier 213 may perform other or additional story-related functions, such as identifying popular or trending stories, summarizing stories by determining popular or representative content items in the story, identifying representative images for news stories, or the like. As the news story identifier 213 identifies news stories, it stores the identified news stories in the story index 217d.

The story index 217d includes data structures for representing and indexing news stories. A news story stored in the story index 217d may include a list of content items (or identifiers thereof) that are part of the stored news story. In addition, the story index 217d may include one or more indexes, such that news stories may be efficiently searched or otherwise accessed. For example, the story index 217d may include an index that maps entities to news stories, such that news stories relevant to a given entity may be efficiently retrieved. Additional indexing techniques or structures are described with respect to FIG. 4F, below.

The content recommender 214 provides indications of news stories (or individual content items) in response to a request received from a user 202 or a device operated by the user 202. In one embodiment, the content recommender 214 provides an interface (e.g., a Web-based interface, an application program interface) that receives requests/queries that specify one or more keyterms, entities, and/or categories. In response, the content recommender 214 determines news stories (stored in index 217*d*) that are related to at least one of the one or more keyterms, entities, and/or categories, and provides (e.g., transmits, sends, forwards) indications of the determined news stories. In another embodiment, the content recommender 214 operates in a "push" model, where it provides a stream or feed of news stories related to one or more queries.

The optional other content recommender 215 provides recommendations of other types of content obtained from or provided by third-party services/sources. In some embodiments, the recommender 215 may query third-party services to retrieve other media types (e.g., videos, podcasts, social media messages) that may not be included in the content index 217*a*. In one embodiment, the recommender 215 may, given a specified news story, automatically construct a query adapted for a third-party information/content service by taking the top keyterms or entities (e.g., top three) from a list of current and popular keyterms or entities for the specified news story. Indications of the results of the query (e.g., videos, podcasts) may then be included as part of the specified news story.

In addition, although the described techniques for content recommendation are illustrated primarily with respect to textual content, other types of content are contemplated. In one embodiment, the CRS 200 may utilize at least some of the described techniques to perform or facilitate the recommendation of activities based on other types of content, including advertisements, audio (e.g., music), video, images, and the like. In some embodiments, the CRS 200 is configured to ingest video streams (e.g., live streaming of sports games) in a similar fashion. In particular, the CRS 200 may obtain text content from the stream via either closed captions or speech recognition. Then, the CRS 200 analyzes the obtained text content as discussed above, such that the CRS 200 can provide news story recommendations for such content items as well.

Furthermore, the described techniques are not limited to the specific architecture shown in FIG. 2. For example, in some embodiments, content ingestion and relationship identification may be performed by another (possibly external or remote) system or component, such as a stand-alone content indexing, search, and discovery system. In other embodiments, the CRS 200 may not interact directly with users as shown, but rather provide user interface components (e.g., recommender widgets, plug-ins) that may be embedded or otherwise incorporated in third-party applications or systems, such as Web sites, smart phones, desktop systems, and the like.

Although the techniques of news story recommendation and the CRS are generally applicable to any type of content item, the phrase "content item" is used generally to refer to or imply any type of information and/or data, regardless of form or purpose. For example, a content item may be in textual or binary format, or a content item may be a news item, a report, an image, an audio source, a video stream, a code module (e.g., an application, an executable), an online activity (e.g., to purchase a good or service), or the like. Also, although certain terms are used primarily herein, other terms could be used interchangeably to yield equivalent embodiments and examples. For example, the term "category" and "facet" are used interchangeably. In addition, other terms for "story" may include "news story," "event," "current event," "occurrence," "happening," or the like. Also, the terms "keyword" and "keyterm" are used interchangeably. Other terms for category may include "class," "property-based set," or the like. In addition, terms may have alternate spellings which may or may not be explicitly mentioned, and all such variations of terms are intended to be included.

Example embodiments described herein provide applications, tools, data structures and other support to implement a content recommendation system to be used for identifying and recommending news stories that include multiple related content items. Other embodiments of the described techniques may be used for other purposes, including for identification of groups of references (e.g., academic papers or texts) that are relevant to particular historical events (e.g., the signing of the Declaration of Independence, Columbus's voyage to the New World, the invention of the telephone). In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described is not limited by the particular order, selection, or decomposition of steps described with reference to any particular routine.

3. Example Screen Displays

Figure 3A:
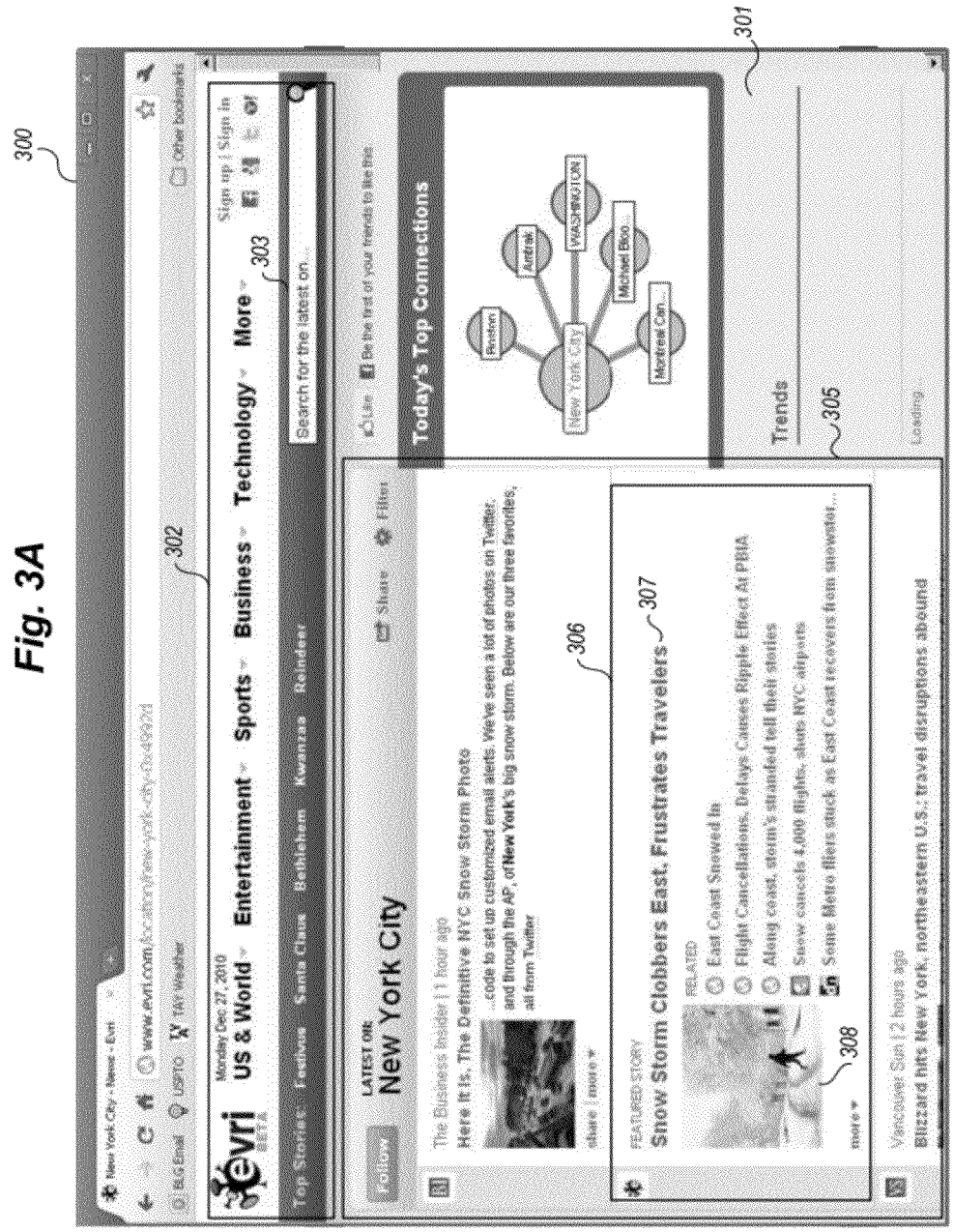
FIGS. 3A-3C illustrate example screen displays provided by an example embodiment of a content recommendation system.
Figure 3B:
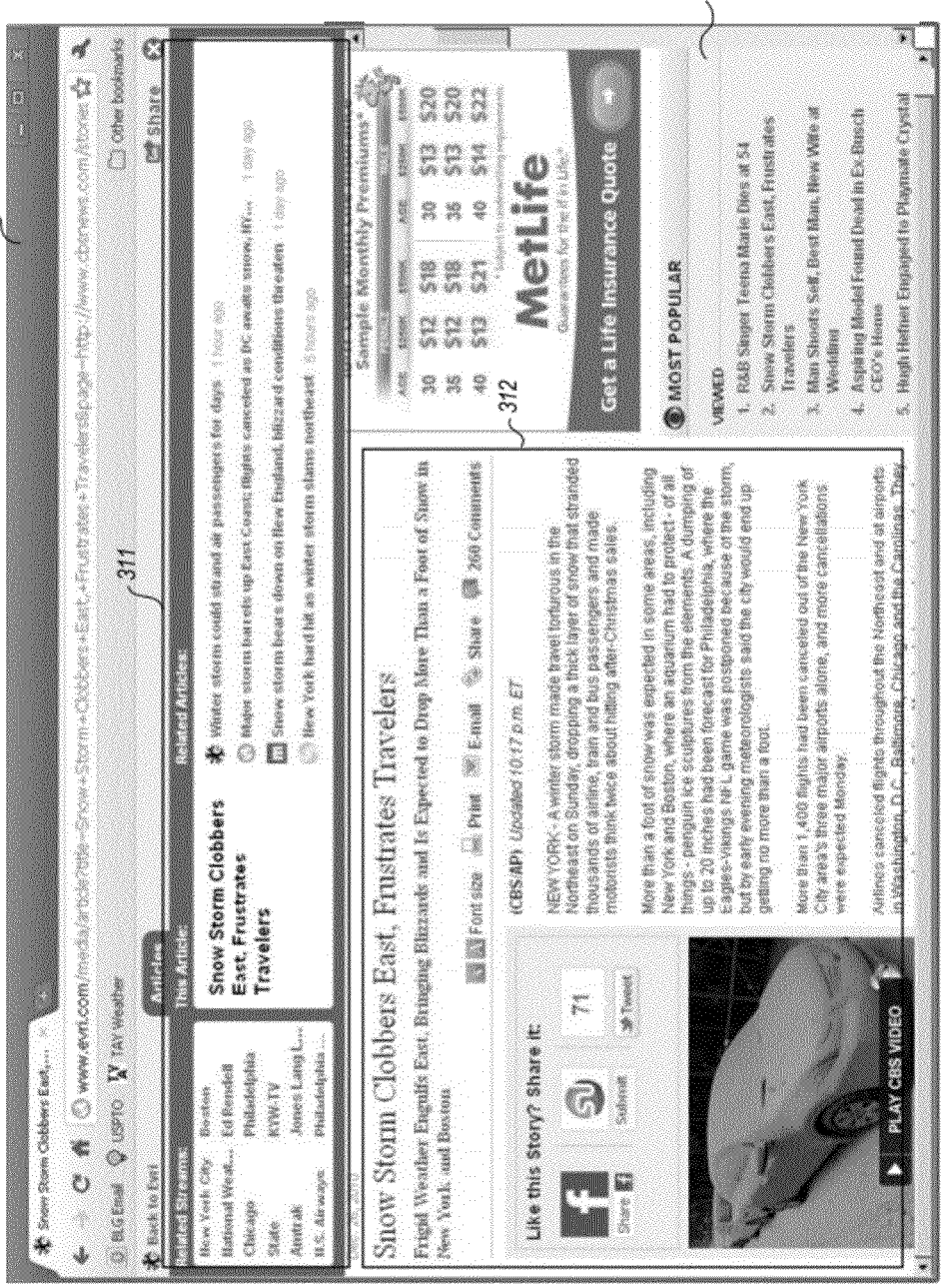
Figure 3C:
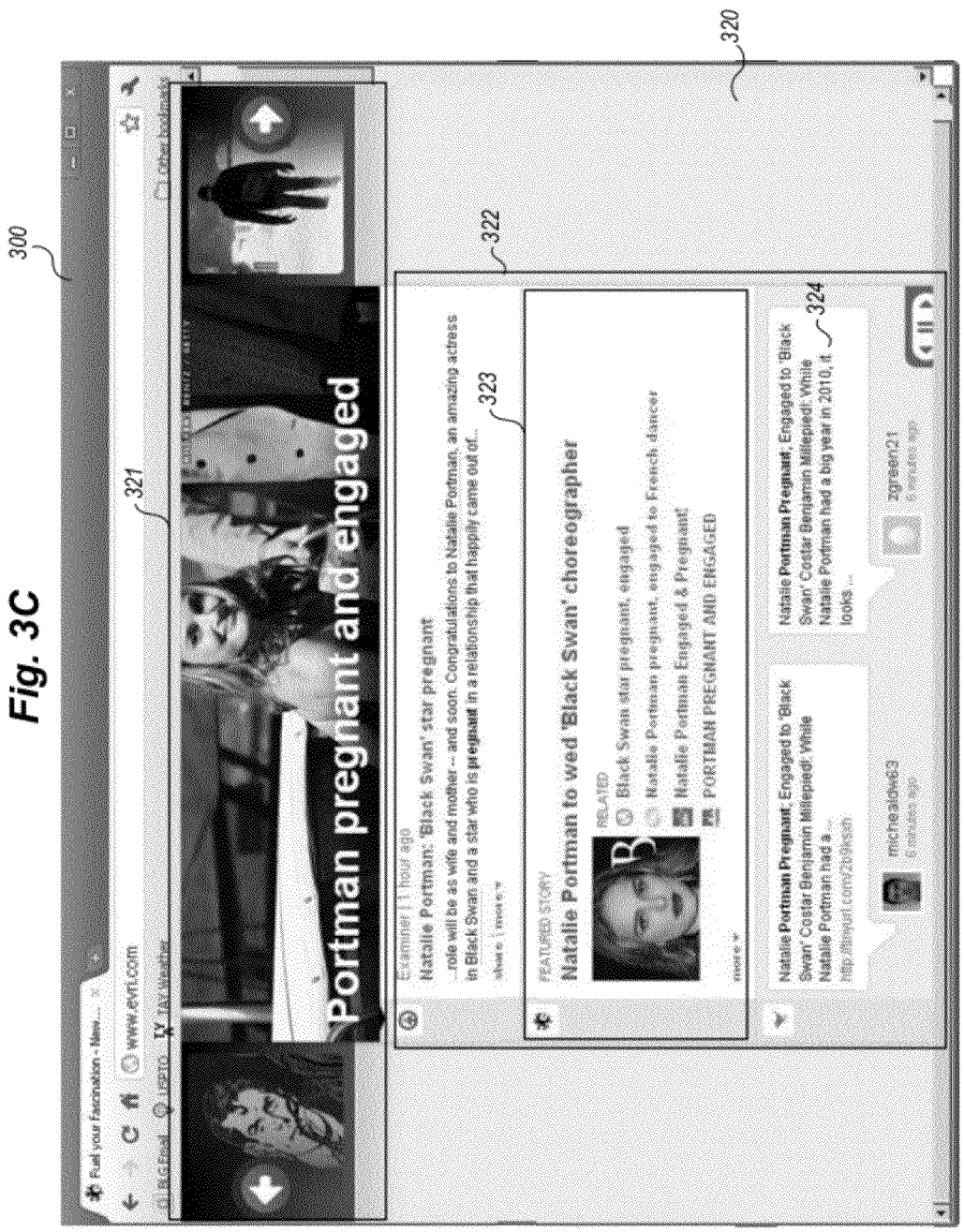

FIGS. 3A-3C illustrate example screen displays provided by an example embodiment of a content recommendation system. In particular, FIG. 3A illustrates a Web browser 300 that displays a screen 301 (e.g., defined by a received Web page) that is being used by a user to interact with the content recommendation system to view news items. The screen 301 includes a menu bar 302 and a news area 305. The menu bar 302 includes multiple controls, such as the search control 303, the links labeled "US & World," "Entertainment," "Sports," "Business," "Technology," and the like. The illustrated controls allow a user to obtain news items related to particular keyterms, entities, and/or categories, indications of which are then displayed in the news area 305. In this example, a user has indicated that he desires to obtain news items related to New York City, such as by entering the appropriate terms in the search control 303. In response, the CRS has updated the news area 305 to display indications of news items (e.g., individual news articles) and/or news stories including multiple news items about or related to New York City.

In particular, the news area 305 includes a story section 306. The story section 306 provides information about the news items contained in a story. At about the time of this example, the east coast of the United States was in the grips of a major winter storm. The CRS automatically generated, using the techniques described herein, a news story that included multiple news items about the winter storm. New York City was heavily impacted by the storm, meaning that many of the news items in the story reference or are otherwise related to New York City. As a result, the news story was deemed to be particularly relevant to New York City, and was thus selected by the CRS for display in the news items area 305.

The story section 306 includes a representative story link 307, a representative image 308, and additional links (e.g., "East Coast Snowed In") to other news items that give accounts of the story. Note that all of the indicated news items of the displayed story are related to a particular event (e.g., the snow storm) and are thus related both in terms of subject matter (e.g., snow storms, east coast cities of the United States, air travel) and time (e.g., occurring during a short period of time in late December, 2010). Furthermore, not all of the news items in the story will necessarily directly reference New York City, but they are all likely about an event (e.g., the snow storm) that impacted New York City.

FIG. 3B illustrates information presented in response the selection of an indicated news item of a news story. In this example, the user has selected link 307 in the story section 306, and in response, the CRS has displayed a screen 310 that includes a related information bar 311 and a news item section 312. The news item section 312 displays the news item data, such as headline, byline, date, text, images, and the like. The related information bar 311 includes links to other news items (e.g., "East Coast Snowed In") that are in the story and/or related to the indicated news item. In addition, the related information bar 311 includes links to entities (e.g., New York City, Boston, Amtrak) and/or categories that are related to the story and/or the indicated news item. By using the related information bar 311, the user can obtain information about other news items in, or related concepts to, the story and/or indicated news item. In some embodiments, the related information bar 311 is "sticky," in that it will remain displayed when the user navigates to other news items or concepts in the story and/or indicated news item.

FIG. 3C illustrates news story navigation and recommendation provided by another embodiment. In FIG. 3C, the Web browser 300 is displaying a screen 320 that includes a news story selection bar 321 and a story information section 322. The news story selection bar 321 includes controls (e.g., left and right arrows) that, when selected by the user, cause the CRS to update the story information section 322 to present information about a current story. In this example, the user has selected a story about actor Natalie Portman's pregnancy and engagement. In response, the story information section 322 has been updated to include indications (e.g., links) of multiple news items in the selected story. Note that the news items may be further grouped, such as via section 323. Note also that news items of other media types may be supported. For example, item 324 indicates a social media message, such as a Twitter post. Other message types may be supported, including from third-party social networks (e.g., status updates or messages from a social network) and other file/media formats (e.g., Podcasts, audio files, videos).

Although the news story recommendation techniques of FIGS. 3A-3C have been described primarily with reference to Web-based technologies, the described techniques are equally applicable in other contexts. For example, news story recommendation may be performed in the mobile computing context, such as via a newsreader application/module or other type of code module that is configured to execute on a mobile device (e.g., a smart phone, tablet computer) in order to present news or other content items for consumption by a user.

4. Story Identification in an Example Embodiment

FIGS. 4A-4F illustrate example data processed, utilized, or generated by an example embodiment of a content recommendation system. In particular, FIGS. 4A-4F illustrate example data used to support a running example of story identification performed by an example embodiment of a content recommendation system.

Figure 4D:
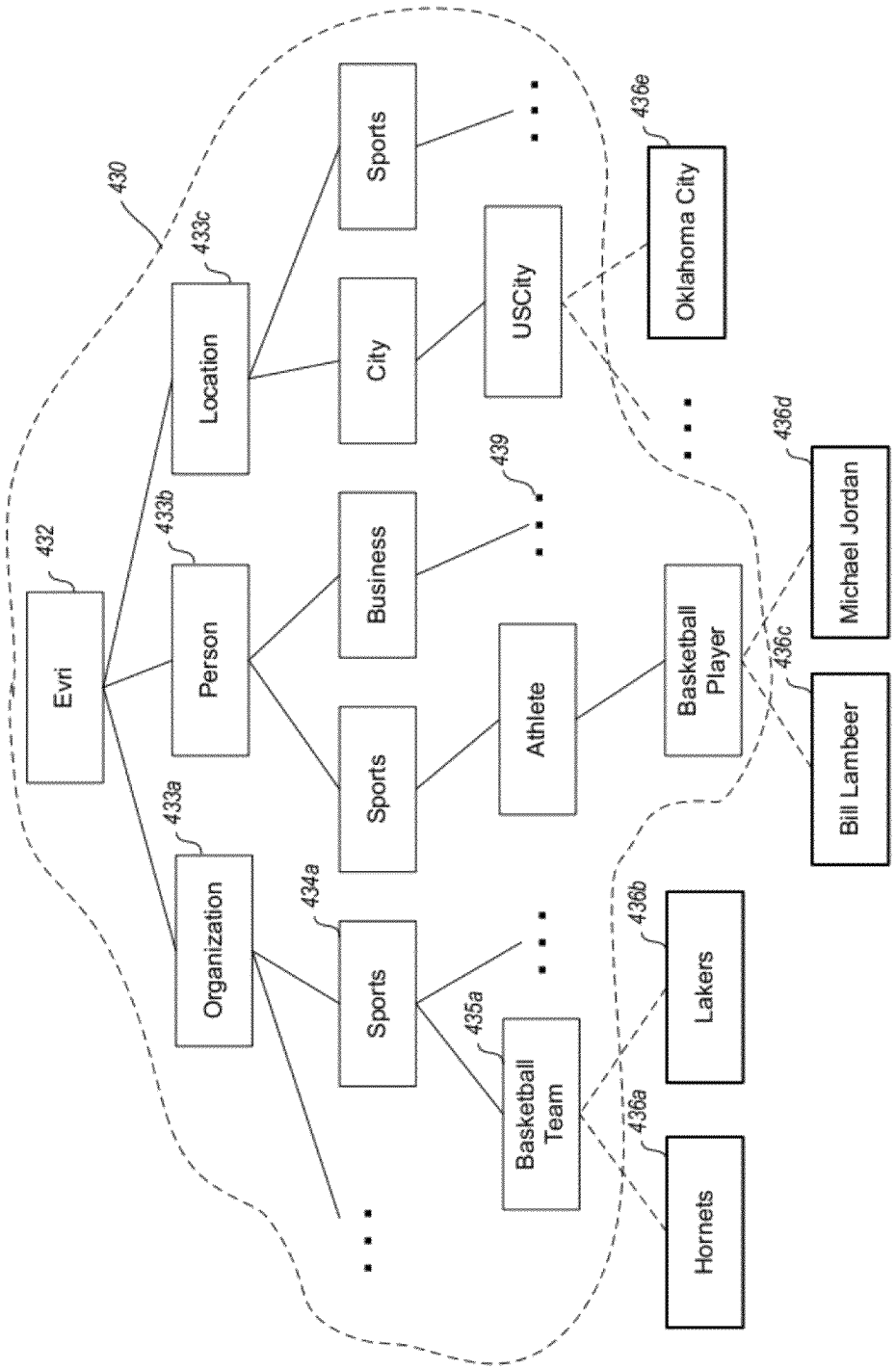

FIG. 4A shows a representation of an entity. In particular, FIG. 4A illustrates an XML-based representation of a basketball team entity named the New Orleans Hornets. In FIG. 4A, the Hornets team is represented by structure 400, which includes a facets section 402, a name section 404, a properties section 406, and a type section 408. The facets section 402 represents one or more facets/categories, each of which includes a facet name (e.g., "Basketball Team") and a taxonomic path (e.g., "Evri/Organization/Sports/Basketball_Team"), which is a path in a taxonomic tree or other type semantic graph. An example taxonomic graph is described with respect to FIG. 4D, below. The name section 404 represents a canonical name (e.g., "New Orleans Hornets") for the illustrated entity. The properties section 406 represents one or more properties of the entity, which are name-value pairs that describe some aspect of the entity. In this example, the properties are "location_city=New Orleans, La.," "owned_by=Gary Chouest," and "owned_by=George Shinn." The type section 408 indicates a "top level" category to which the entity belongs, in this case ORGANIZATION. As discussed above, entities such as the one described with respect to FIG. 4A may be determined automatically by processing text documents and stored in an entity repository, such as the entity store 217b of FIG. 2.

FIG. 4B illustrates an example content item processed by the CRS. In particular, FIG. 4B illustrates a news item 410, which gives an account of an ownership transfer of the New Orleans Hornets basketball team. The news item 410 includes entity references 412a-412i. An entity reference includes one or more terms (e.g., words, abbreviations, acronyms) that reference an entity that may be represented by the CRS. Note that only some entity references are denoted for clarity of illustration. The CRS processes the text of the news item 410, recognizes the entity references 412a-412i, and determines (e.g., links, cross references, indexes) the references to corresponding entities stored in the entity store. For example, references 412b, 412c, and 412i are linked to the New Orleans Hornets entity described with respect to FIG. 4A; reference 412e is linked to a National Basketball Association entity; reference 412f is linked to a New Orleans entity; and reference 412h is linked to an Oklahoma City entity.

Note that in some situations, some entity references may not be linked to an entity stored in the entity store. This may occur because the entity is not yet known to the CRS or for other reasons. For example, in this case, references 412a, 412d, and 412g reference a Gary Chouest entity, but if that entity does not exist in the entity store, the CRS may not create a link. In other embodiments, the CRS may automatically generate a new entity and a corresponding link.

When processing the content item 410, the CRS may perform other or additional functions, such as recording and counting keyterms (whether or not such keyterms reference entities), assigning categories/facets to recognized entities, ranking entities or the like. In the example of FIG. 4B, processing the text of content item 410 may result in the identification of Sports as the main category associated with the content item; and basketball_team, us_city, sports_league, sports_executive, and state as its top facets. In one embodiment, the CRS may also rank the recognized entities, keyterms, and/or categories by their importance and relevance to the main subject of the content item. The ranking may be based on one or more of the following factors: number of mentions (e.g., references) of each entity in the text; positions of the mentions in the text (e.g., entities appearing in document title may be weighted more; entities appearing earlier in the text would be weighted more than the ones appearing later in the text; entities appearing in boilerplate text may be weighted less); penalties to certain types of entities (e.g., if the publisher of the document appears in the text, it may be weighted less); inverse document frequency (IDF) of a keyterm; or the like.

FIG. 4C illustrates example data determined by the CRS when processing the content item of FIG. 4B. FIG. 4C depicts a table 420 that represents a term frequency-inverse document frequency ("TF-IDF") vector. Each row of the table represents information about a keyterm identified in the text of content item 410, including a term 422a, a TF-IDF score 422b, an entity identifier ("ID") 422c, and a term frequency 422d. For example, row 424a represents the keyterm "gary chouest" and its corresponding TF-IDF score of 47.6, entity ID of null, and term frequency of 12. As noted above, the CRS may not represent every entity it encounters, and this is indicated by a null value in this example. As another example, row 424b represents the keyterm "new orleans hornets" and its corresponding TF-IDF of 47.0, entity ID of 301240, and term frequency of 7. The non-null entity ID indicates in this example that the New Orleans Hornets is a known entity to the CRS. Note that entities are represented here using their canonical names. For example, row 424b uses "new orleans hornets," even though other references may have been used in the underlying article (e.g., Hornets, NO Hornets). Furthermore, the term frequency 422d in some cases be weighted, such as by weighting occurrences in a title more than verbs and adjectives.

Other or additional information may be determined for each processed content item. In some embodiments, for each processed content item, a data structure or record may be created that includes one or more of: a content item ID, content item URL, title, length (e.g., number of words/bytes), date, image associated with the content item (if any), a text snippet from the content item, topics or facets assigned to the content item together with their respective weights, a vector of keyterms as illustrated with respect to FIG. 4C, and the like.

FIG. 4D shows a portion of an example taxonomic tree. In particular, FIG. 4D illustrates a taxonomic graph 430. The illustrated taxonomic graph 430 is a tree that represents a hierarchy of categories that each have zero or more child categories connected via an arc or link representing a relation. The hierarchy begins with a unique root category (here labeled "Evri") 432, which has child categories 433a-433c, respectively labeled Organization, Person, and Location. Category 433a has child category 434a, which in turn has child category 435a. Portions of the graph 430 that are not shown are illustrated by ellipses, such as ellipses 439. FIG. 4D also illustrates entities 436a-436e, linked to their respective categories (e.g., via an is-a relation). For example, entities 436a (New Orleans Hornets) and 436b (Lakers) are Basketball Teams (435a). Although the illustrated graph 430 is a tree in the illustrated embodiment, in other embodiments other graph structures may be utilized, including general directed or undirected graphs.

A taxonomic path is a path between one category and another in the graph 430. For example, the path connecting categories 432, 433a, 434a, and 435a form a taxonomic path that specifies the Basketball Team category as well as all of its ancestor categories up to the root of the graph 430. The path connecting categories 432, 433a, 434a, and 435a, may also be denoted textually as: "Evri/Organization/Sports/Basketball_Team."

Figure 4E:
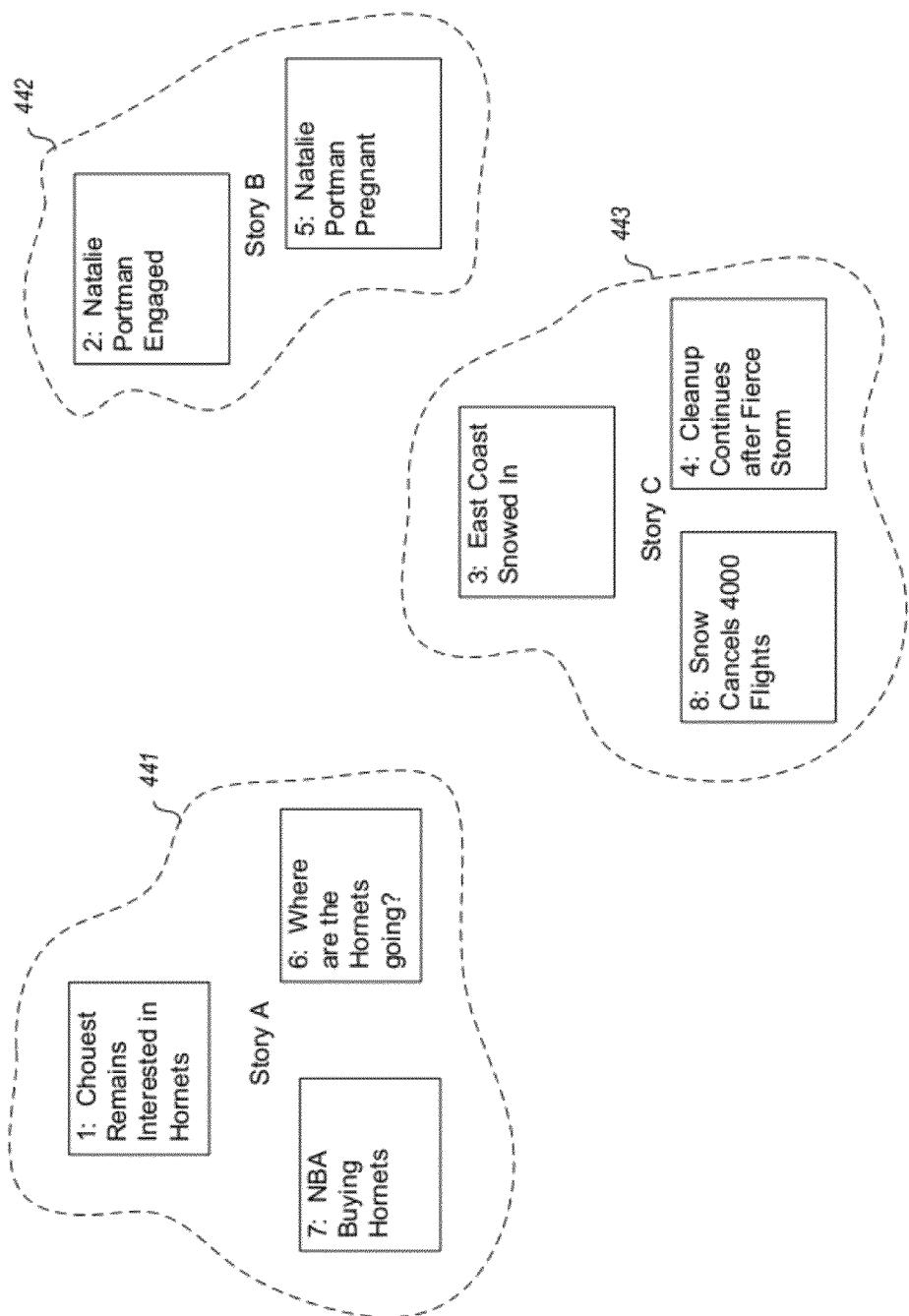

FIG. 4E depicts multiple stories identified by an example embodiment. In particular, FIG. 4E shows stories 441-443 that each include multiple content items. The stories are identified by the CRS using the techniques described herein, for example as described with respect to FIGS. 6 and 7, below. Story 441 ("Story A") includes content items having identifiers 1, 6, and 7. Story 441 may correspond, for example, to the sale of the New Orleans Hornets to the NBA. Content item 1 may correspond, for example, to news item 410 described with respect to FIG. 4B, above. Story 442 ("Story B") includes content items having identifiers 2 and 5. Story 442 may correspond, for example, to the story about Natalie Portman's engagement/pregnancy described with respect to FIG. 3C, above. Story 443 ("Story C") includes content items having identifiers 3, 4, and 8. Story 443 may correspond, for example, to the story about an east coast snow storm described with respect to FIG. 3A, above.

This example illustrates one of the benefits of clustering based on entities and/or categories. A system that groups content items based only on keywords will tend to create under- or over-inclusive groups. For example, a group determined based only on the keyword "Hornets" may include an article about the insect hornets, when what was intended was the basketball team. Similarly, a group determined based only on the keyword "New Orleans Hornets" may not include articles that do not refer to the basketball team by its full name. On the other hand, by determining news stories based on entities and other semantic information (as performed by the CRS), articles that refer to the insect hornet will not appear in a news story about the New Orleans Hornets basketball team, because the insect hornet articles are referring to an entity that is different from the New Orleans Hornets basketball team entity. Similarly, articles that use different names for the New Orleans Hornets basketball team (e.g., "Hornets," "NO Hornets," "New Orleans Hornets") would all appear in a news story about the basketball team, because those articles are all known to the CRS as referring to the same entity.

FIG. 4F depicts a data structure used in an example embodiment for indexing information about identified stories, such as those described in the example of FIG. 4E. In particular, FIG. 4F depicts a table 450 that maps entities to corresponding to stories. Each row of the table represents a correspondence (e.g., mapping) between an entity 452a and multiple stories 452b that have been identified by the CRS. The entity field 452a represents an entity, here illustrated using its canonical name for clarity, although in other embodiments an entity identifier (e.g., a per-entity unique number) may be used instead or in addition. The story field 452b represents a set of tuples, each tuple including a story identifier and a relevance measure. Relevance of story to an entity, keyterm, or category may depend on various factors, including size of a story (stories with more articles may be more important), TF-IDF measure for an entity/keyterm/category within a story (the more frequently an entity is referenced in a story, the more relevant the story is to the entity), recency of a story (more recent stories may be more important), and the like.

In this example, each row maps an entity/keyterm to the three stories A, B, and C described with respect to FIG. 4E, above. For instance, in row 454a, the entity Natalie Portman is mapped to the three stories A, B, and C with respective relevance measures of 0.0, 0.7, and 0.1. As may be expected the entity Natalie Portman is most relevant (as shown by relevance of 0.7) to story B, which is about Natalie Portman's pregnancy/engagement. Also, in this example, Natalie Portman is slightly relevant (a measure of 0.1) to story C, which is about an east coast snow storm, perhaps because the story includes a news item about how Natalie Portman was delayed at Kennedy Airport due to the storm. Similarly row 454b the entity New Orleans Hornets is mapped to the three stories A, B, and C with respective relevance measures of 0.8, 0.1, and 0.0. As also may be expected, the entity New Orleans Hornets is most relevant (as shown by relevance of 0.8) to story A, about the sale of the New Orleans Hornets. The New Orleans Hornets are in this example also slightly relevant (0.1) to the story about Natalie Portman's pregnancy/engagement, perhaps because that story includes a news item noting that Natalie Portman is a Hornet's fan.

The CRS may generate and/or manage other data structures that facilitate efficient searches for news stories that are relevant to particular entities, keyterms, categories, or the like. Other mappings may include one or more of the following:

category→(termStoryId1, termStoryId2, . . . termStoryIdN)

keyterm→(termStoryId1, termStoryId2, . . . , termStoryIdP)

storyId→storyData date, entity ID→(termStoryId1, termStoryId2, . . . , termStoryIdM)

date, category→(termStoryId1, termStoryId2, . . . , termStoryIdN)

date, keyterm→(termStoryId1, termStoryId2, termStoryIdP)

In the above, termStoryIdx denotes a tuple of [story identifier, relevance] as described with respect to FIG. 4F. Note also that the mappings may include correspondences between date/entity pairs and corresponding stories. In this manner, efficient date-based retrieval of stories may be facilitated. For example, the CRS may support queries for stories relevant to a particular entity, category, or keyterm during a particular time period.

Also, the CRS stores story data for each story. Story data may include one or more of: a representative content item including a text snippet; a representative image (if such exists); a story centroid (e.g., average) represented as a vector of n keyterms with corresponding entity identifiers, number of occurrences, and TF-IDF measure; top categories for the story; time of publication of content items in the story; number of content items in the story; a list of content items in the story; sub-stories in a story (if any); a growth factor that indicates how fast a story is growing in a recent period of time; and the like.

In some embodiments, the representative content item for a story is a content item that is closest to the centroid of a story and has credibility larger than a specified credibility threshold. Similarly, the representative image may be an image belonging to a content item that is closest to the centroid and that has credibility larger than a credibility threshold. In other embodiments, a representative image may be an image that has a caption that references one or more entities/keyterms/categories that are relevant to a story.

In some embodiments, story information and mappings may be represented, stored, or indexed as key-value pairs using a distributed hash table (e.g., Apache Cassandra, http://cassandra.apache.org/), which has properties of decentralization, scalability, and fault tolerance. In other embodiments, story indexes may be implemented using a text search engine (e.g., Apache Lucene, http://lucene.apache.org/). In such an embodiment, for each key-value pair, the key (e.g., entity, category) will be tokenized and indexed so that it can be searched on, while the value (e.g., list of stories with corresponding relevance scores) will be stored for returning with search results.

Given an assortment of the above-described data structures and/or mappings, various embodiments may provide a search facility. Such a search facility may take as an input a query that specifies some combination of entity identifiers, facets, categories, keyterms and/or topic areas, and returns in response one or more stories that are relevant to the received query. The returned stories may be ranked or ordered based on various factors, including one or more of: relevance to the input query, chronological order, the size of a story, story recency, the rate of growth of a story, and importance of a concept/entity/category to the story. In one embodiment, the relevance of a story to the input query may be computed as a linear sum of relevance of the story to every element (e.g., entity, keyterm, category) of the query. In other embodiments, the relevance measure may be modified by using inverse document frequency (IDF) measures, such as may be provided in a typical vector space model (e.g., as used in Apache Lucene).

In addition, query results may be filtered or modified based on time. In one example embodiment, stories within a particular (e.g., user or system specified) timeframe are returned. For example, only stories that have been active during the past week may be returned. In other cases, the stories themselves may be modified, so as to eliminate or hide content items that may be part of the story, but that are old (e.g., more than a week, month, year) and thus may not be particularly relevant to whatever current developments (e.g., those occurring during the last week or month) there may be in the story. As noted, the techniques described herein may be extended to other types of media provided by third-party sources, including video, audio, social network messages (e.g., Twitter messages), and the like. Third-party sources may include or provide content items of various media types (e.g., images, videos, audio, social media messages), some of which may not be indexed by the CRS. The CRS may be configured to retrieve results via external APIs or other retrieval facilities provided by the third-party sources. In one embodiment, a query suitable for a third-party source may be constructed by using the top N terms (e.g., keyterms or names of entities) that describe a story. Such a query may then be submitted to the third-party source, and results therefrom may be included as part of the story. Other query enhancement or generation techniques are described in U.S. Patent Application No. 61/256,851, filed Oct. 30, 2009, and entitled "IMPROVING KEYWORD-BASED SEARCH ENGINE RESULTS USING ENHANCED QUERY STRATEGIES," incorporated herein by reference in its entirety.

5. Example Computing System and Processes

Figure 5:
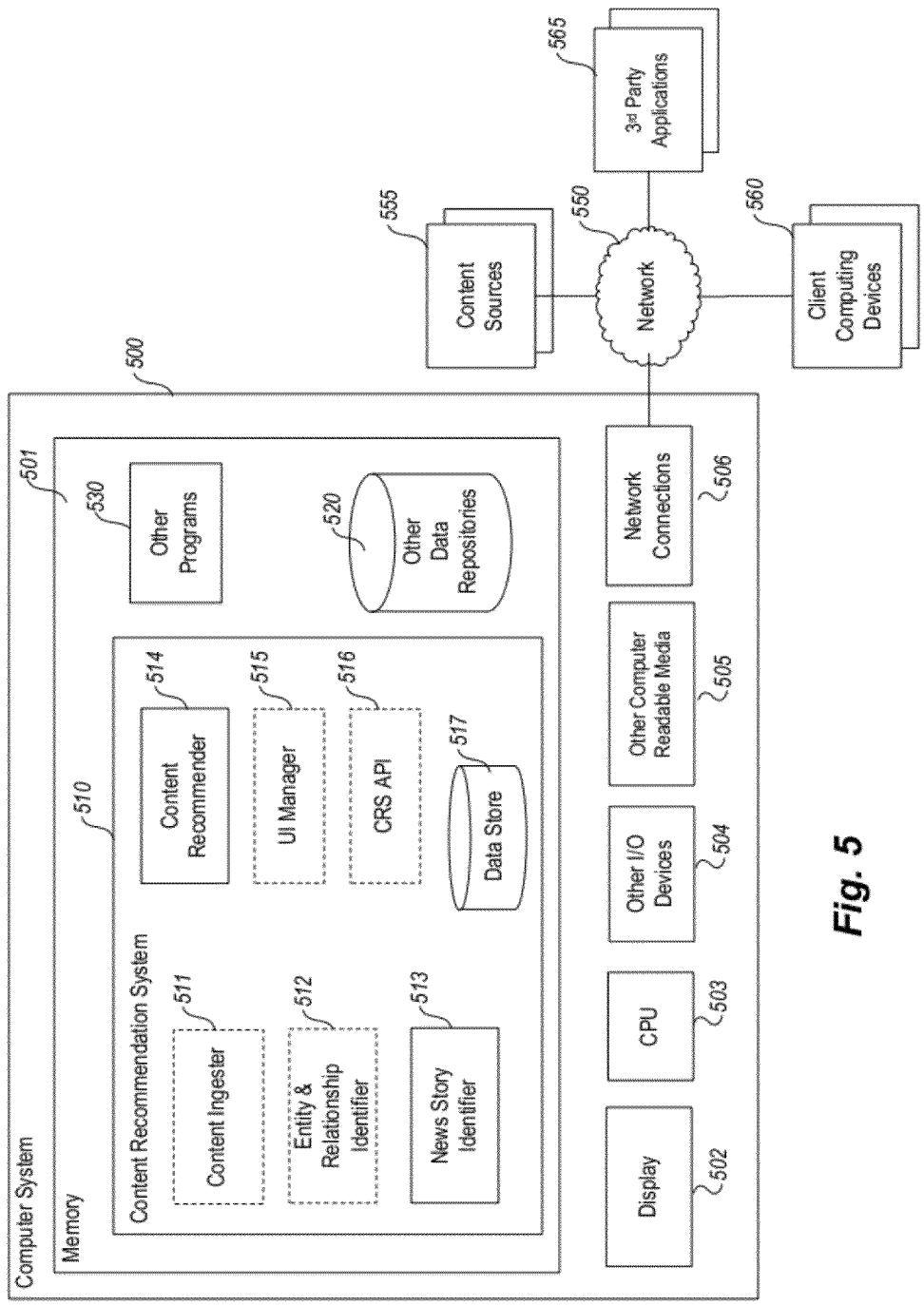
FIG. 5 is an example block diagram of an example computing system for implementing a content recommendation system according to an example embodiment.

FIG. 5 is an example block diagram of an example computing system for implementing a content recommendation system according to an example embodiment. In particular, FIG. 5 shows a computing system 500 that may be utilized to implement a content recommendation system 510.

Note that one or more general purpose or special purpose computing systems/devices suitably instructed may be used to implement the content recommendation system 510. In addition, the computing system 500 may comprise one or more distinct computing systems/devices and may span distributed locations. Furthermore, each block shown may represent one or more such blocks as appropriate to a specific embodiment or may be combined with other blocks. Also, the content recommendation system 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The content recommendation system 510 is shown residing in memory 501. In other embodiments, some portion of the contents, some or all of the components of the content recommendation system 510 may be stored on and/or transmitted over the other computer-readable media 505. The components of the content recommendation system 510 preferably execute on one or more CPUs 503 and recommend activities based on mobile device context, as described herein. Other code or programs 530

(e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

The content recommendation system 510 interacts via the network 550 with content sources 555, third-party applications 565, and client computing devices 560. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The devices 560 include desktop computers, notebook computers, mobile phones, smart phones, personal digital assistants, tablet computers, and the like.

In a typical embodiment, the content recommendation system 510 includes a content ingester 511, an entity and relationship identifier 512, a new story identifier 513, a content recommender 514, a user interface manager 515, a content recommendation system application program interface ("API") 516, and a data store 517. The modules 511-514 respectively perform functions such as those described with reference to modules 211-214 of FIG. 2. The data store 517 performs functions and includes data similar to those described with reference to data store 217 of FIG. 2. The content ingester 511, entity and relationship identifier 512, user interface manager 515, and API 516 are drawn in dashed lines to indicate that in other embodiments, functions performed by one or more of these components may be performed externally to the content recommendation system 510. For example, a separate content indexing and search system may host the content ingester 511, entity and relationship identifier 512, and at least some of the data store 517.

The UI (user interface) manager 515 provides a view and a controller that facilitate user interaction with the content recommendation system 510 and its various components. For example, the UI manager 515 may provide interactive access to the content recommendation system 510, such that users can search for news stories related to specified queries. In some embodiments, access to the functionality of the UI manager 515 may be provided via a Web server, possibly executing as one of the other programs 530. In such embodiments, a user operating a Web browser executing on one of the client devices 560 can interact with the content recommendation system 510 via the UI manager 515. For example, a user may manually submit a search for content items related to a specified entity, keyterm, category, or the like.

The API 516 provides programmatic access to one or more functions of the content recommendation system 510. For example, the API 516 may provide a programmatic interface to one or more functions of the content recommendation system 510 that may be invoked by one of the other programs 530 or some other module. In this manner, the API 516 facilitates the development of third-party software, such as user interfaces, plug-ins, news feeds, adapters (e.g., for integrating functions of the content recommendation system 510 into Web applications), and the like.

In addition, the API 516 may be in at least some embodiments invoked or otherwise accessed via remote entities, such as code executing on one of the client devices 560 or as part of one of the third-party applications 565, to access various functions of the content recommendation system 510. For example, an application on a mobile device may obtain recommended news stories for a specified entity via the API 516.

As another example, one of the content sources 555 may push content information to the content recommendation system 510 via the API 516. The API 516 may also be configured to provide recommendation widgets (e.g., code modules) that can be integrated into the third-party applications 565 and that are configured to interact with the content recommendation system 510 to make at least some of the described functionality available within the context of other applications.

The data store 517 is used by the other modules of the content recommendation system 510 to store and/or communicate information. In particular, modules 511-516 may use the data store 517 to record various types of information, including semantic information about content items, such as entities, categories, and relationships. Although the modules 511-516 are described as communicating primarily through the data store 517, other communication mechanisms are contemplated, including message passing, function calls, pipes, sockets, shared memory, and the like.

In an example embodiment, components/modules of the content recommendation system 510 are implemented using standard programming techniques. For example, the content recommendation system 510 may be implemented as a "native" executable running on the CPU 503, along with one or more static or dynamic libraries. In other embodiments, the content recommendation system 510 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the content recommendation system 510, such as in the data store 517, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 517 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the content recommendation system 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 6:
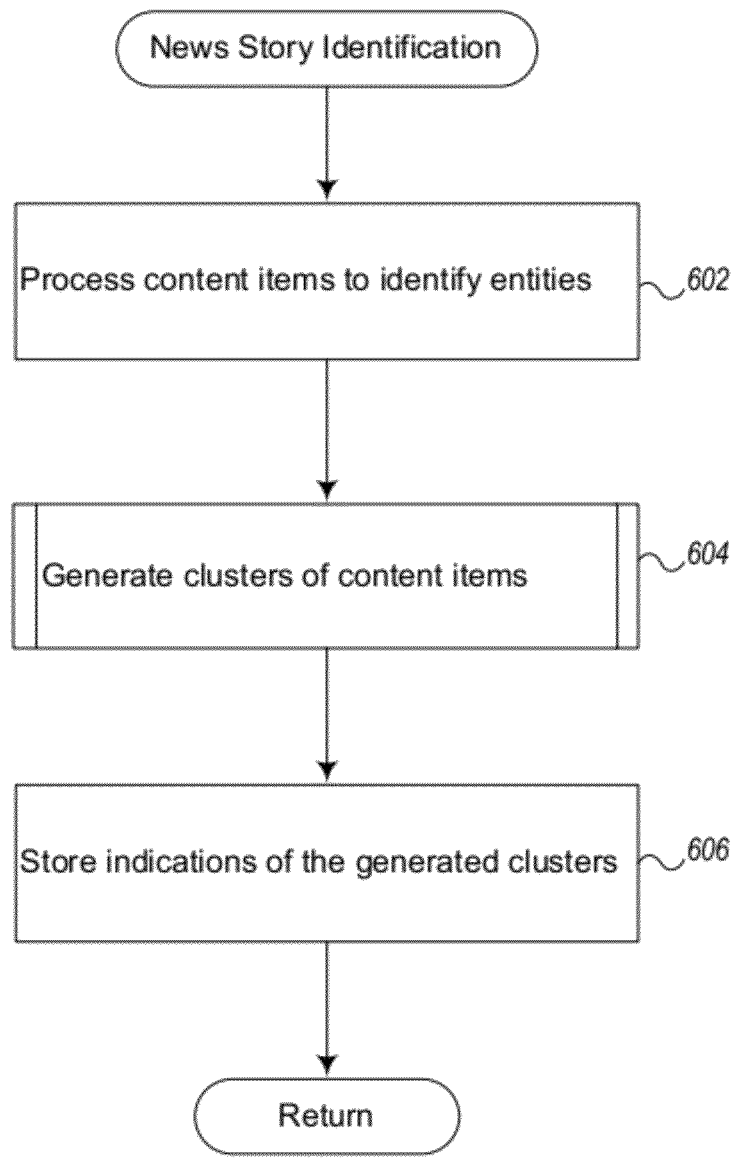
FIG. 6 is an example flow diagram of a new story identification process performed by an example embodiment.

FIG. 6 is an example flow diagram of a new story identification process performed by an example embodiment. In particular, FIG. 6 illustrates a process that may be implemented by, for example, one or more elements of the content recommendation system 200, such as the content ingester 211, entity and relationship identifier 212, and the news story identifier 213, described with reference to FIG. 2. The process identifies and indexes news stories about events. Each news story includes multiple related content items that each give an account of an event or occurrence, and that each reference entities or categories that are represented by the CRS or some other system.

The illustrated process begins at block 602, where it processes multiple content items to identify entities referenced by each content item. In some embodiments, the identified entities are electronically represented (e.g., stored) by the content recommendation system. Identifying the entities in a content item may further include ranking the entities on factor such as the number/quantity of mentions in the content item, the position of the mentions of the entity in the content item, and/or penalties based on the type of the entity. Other semantic information about content items may be determined here as well, such as keyterms, categories, or facets referenced by the content items.

At block 604, the process generates clusters of content items. Typically, the content items of a generated cluster are all related to one another in that they each reference one or more common entities. Content items may be related in other ways as well, such as by including common keyterms and/or referencing common categories. An example process for generating content clusters is described with respect to FIG. 7, below.

At block 606, the process stores indications of the generated clusters. Storing indications of the generated clusters may include creating and recording a story data structure for each generated cluster. The story data structure may include additional information about the story, such as a snippet, a representative content item, a representative image, or the like. In some embodiments, information about the generated clusters may be indexed, such as by mapping keyterms, entities, categories, or dates (or combinations thereof) to corresponding content clusters. Such mappings may facilitate efficient search operations.

Figure 7:
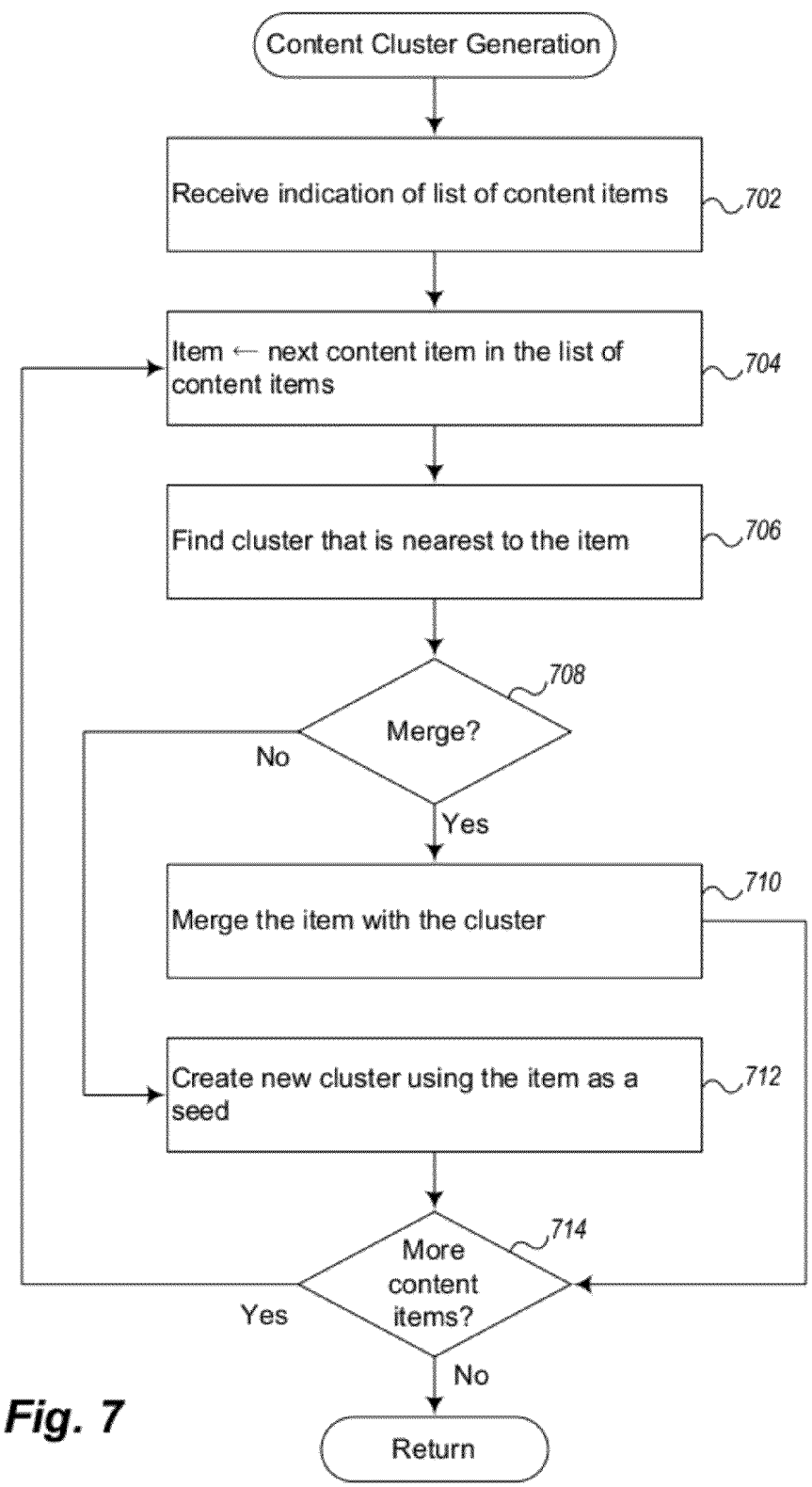
FIG. 7 is an example flow diagram of a content cluster generation process performed by an example embodiment of a content recommendation system.

FIG. 7 is an example flow diagram of a content cluster generation process performed by an example embodiment of a content recommendation system. In particular, FIG. 7 illustrates a process that may be implemented by, for example, one or more elements of the content recommendation system 200, such as the news story identifier 213, described with reference to FIG. 2. The process generates clusters of related content items by merging a given content item into a cluster that is nearest to the content item.

The process begins at block 702, where it receives an indication of a list of content items. In some embodiments the list of content items is a group of content items that have been published or updated within a particular time window, such as 24 hours, 72 hours, one week, or the like. In this manner, the process will focus on generating clusters of content items that are related to one another in a time—as well as content-based manner. The content items may be received in various forms, including as term, entity, or category vectors (e.g., TF-IDF vectors, raw frequency vectors). In the illustrated embodiment, a content item is represented as a term TF-IDF vector, where at least some of the terms indicate or otherwise identify electronically represented entities. In some embodiments, other information or parameters may be provided to the process, including a minimum size threshold (e.g., specifying a minimum size that a cluster must achieve in order to be stored or otherwise maintained), a time window (e.g., specifying a time period in which content items are to be considered for clustering), and the like.

In blocks 704-714, the process performs a loop in which it iterates through the list of content items and attempts to merge each content item into a cluster that is closest to the content item. At block 704, the process selects the next content item in the list of content item, and gives that content item the name "item."

At block 706, the process finds a cluster that is nearest to the item. Finding the nearest cluster may include determining a distance measure between the item and each content item that is already in some cluster. In such an implementation, the nearest cluster is the cluster that contains the nearest content item. Various distance measures may be used. In one embodiment, the cosine distance between content item term vectors may be utilized. Cosine distance represents the cosine of the angle between two vectors, and thus can be used to provide a measure of similarity between two documents represented by term vectors. Another possible distance measure may be computed by simply counting the number of terms in common between two vectors. In other embodiments, the process instead compares the item to a centroid (average) computed for each cluster, such that the nearest cluster is the cluster having a centroid that is nearest to the item.

At block 708, the process determined whether to merge the item into the cluster found at block 706. The decision to merge the item may be based on various conditions or factors, including one or more of: the cosine distance between vectors that represent the top N terms (e.g., top 40 terms) or entities in a content item; the number of common keyterms (or entities or categories) between vectors; and whether a sufficiently high percentage of content items in a cluster have a distance to the item that is below a particular threshold. The latter condition causes the process to avoid merging the item based on its closeness to only a few content items in the cluster, which may occur when the item describes a number of independent events or occurrences. If the merge conditions are met, the process proceeds to block 710, otherwise to block 712.

At block 710, the process merges the item with the cluster. Merging the item with the cluster may include adding the item to a data structure or other type of record to create an association between the content item and the cluster. At this point, the process may also update the centroid of the cluster, so as to reflect its new average.

At block 712, the process creates a new cluster using the item as a seed. Here, a new singleton cluster is created, which may become the basis for a newly identified story. Note that this bock is also visited on the first iteration of the process, as there will be no cluster found that is nearest to the item.

At block 714, the process determined whether there are more content items to process, and if so, continues the loop of blocks 704-714, else returns. Upon returning, the process may transmit, store, or otherwise provide indications of the determined clusters to the component that invoked the process.

The above-described cluster generation process has a quadratic complexity with respect the number of content items. Some embodiments apply one or more heuristics to speed up the clustering process. For example, if all content items in a cluster are older than time threshold and/or the cluster is smaller than the size threshold, the process may attempt to reassign all content items from the small cluster to larger/newer clusters. This technique may lead to the exclusion of news stories that may have only a few content items associated with them. Typically, such stories would be of little interest to a user looking at popular concepts and can otherwise be discovered through a direct search for content items.

Furthermore, in some embodiments, after all content items are processed, the process may look into content items that are smaller than some threshold (e.g., 3, 5, 10), and attempt to assign them to larger clusters. The process may also attempt to merge clusters based on distance between cluster centroids and/or the number of keyterms that are common to feature vectors that contain terms most important to clusters based on TF-IDF measures.

In addition, a particular story may contain a number of sub-stories (or sub-clusters). Thus, some embodiments attempt to find sub-clusters for each cluster. In some embodiments, the well-known k-means algorithm using distance between TF-IDF term vectors may be used to locate sub-clusters. In sub-clustering, the content items in a story are grouped into N (e.g., 4) sub-clusters. Then, the centroids of the sub-clusters are checked for distance from the centroid of the parent cluster. If the distance is larger than some threshold, the sub-cluster is deemed to be significantly different from the parent cluster. Such a sub-cluster may then be separated or split from the parent cluster to form its own cluster. In another embodiment, articles belonging to such a sub-cluster may be presented separately or in some other manner (e.g., with additional annotations) to reflect that the articles belonging to the sub-cluster may contain information that is additionally or distinctly interesting with respect to the event represented by the parent cluster. In addition, the distance between pairs of sub-clusters may be checked, and if the distance is below a threshold, various actions may be taken, such as merging the sub-clusters, or presenting only the larger sub-cluster.

As noted, some embodiments process content items from fixed time windows, such as one 24-hour period of time (e.g., a period from 4 AM on a first calendar day to 4 AM on a subsequent calendar day), three days, one week, or the like. One embodiment processes data in 24-hour chunks that correspond to days. Some embodiments also perform clustering more frequently for current or recently published data. For example, content items published during the most recent day may be processed frequently (e.g., every 15 minutes), and results from previous clustering operations may be discarded, such that only the "freshest" or most recent clustering is maintained. In this way, rapidly developing stories may be tracked.

Figure 8:
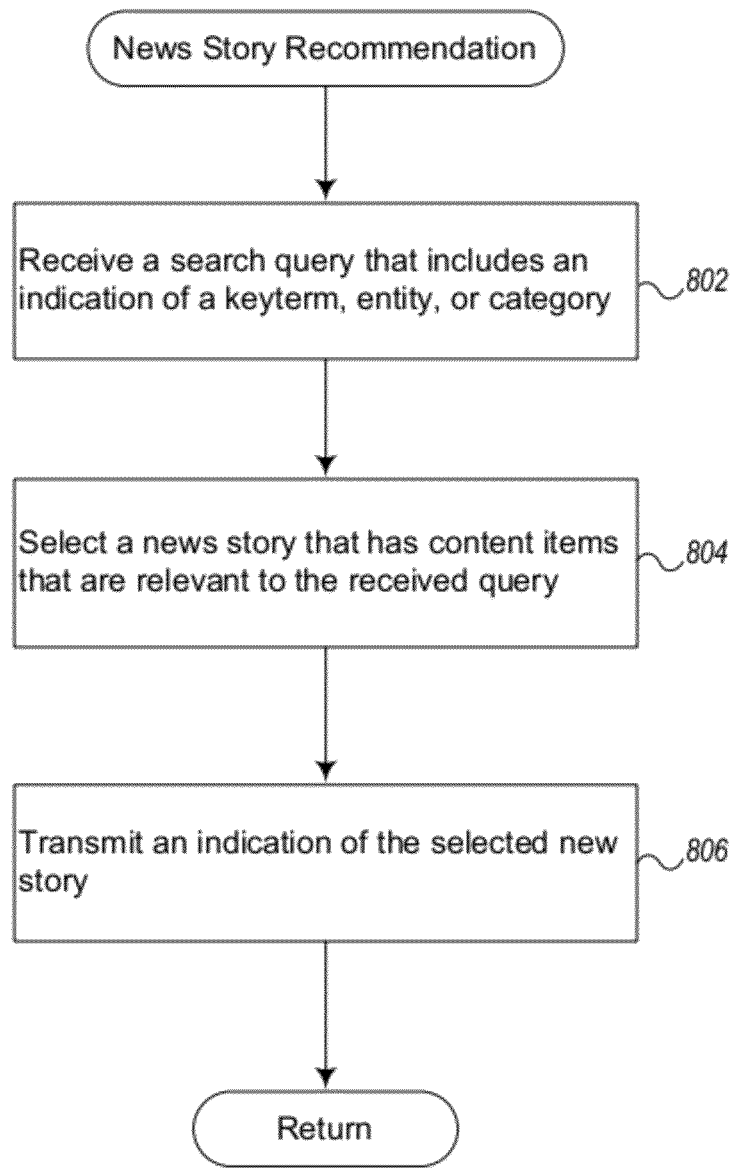
FIG. 8 is an example flow diagram of a news story recommendation process performed by an example embodiment of a content recommendation system.

FIG. 8 is an example flow diagram of a news story recommendation process performed by an example embodiment of a content recommendation system. In particular, FIG. 8 illustrates a process that may be implemented by, for example, one or more elements of the content recommendation system 200, such as the content recommender 214, described with reference to FIG. 2. The process provides indications of news stories that are related or relevant to a specified query content items that are related to a specified keyterm, entity, or category, such as by responding to a search query. Each news story is associated with some event or occurrence, and includes multiple related content items that each give an account of the event and that each reference entities or categories that are represented by the CRS or some other system.

The process begins at block 802, where it receives a search query that includes an indication of a keyterm, entity, or category. The query may be received from an interactive source (e.g., a Web page that provides a search interface) or programmatic source (e.g., an API invoked by some executable).

At block 804, the process selects a news story that has content items that are relevant to the received query. Selecting the news story may include selecting the news story from a plurality of news stories, where the selecting is based on how many keyterms, entities, and/or categories are in common between the received search query and the multiple content items of the selected news story. In some embodiments, this may be achieved by counting the number of elements in common. In other embodiments, the query is itself represented as a term vector, and process compares (e.g., by computing cosine distance or other measure) the query term vector against the term vectors of the content items of the news story. Selecting the news story may also include ordering multiple news stories in various ways. For example, news stories may be ordered based on date, such that newer, timely, or more recent stories can be provided or presented in response to a received query.

At block 806, the process transmits an indication of the selected news story. Transmitting the indication of the selected news story may include transmitting an identifier (e.g., a URL) of the new story and/or information about or from the content item (e.g., representative article, representative image, date information, relevance score).

Some embodiments perform one or more operations/aspects in addition to, or instead of, the ones described with reference to the process of FIG. 8. For example, in one embodiment, after block 806, the process may return to block 802 to receive and process additional search queries. In another embodiment, the process may also select multiple news stories, and rank them based on relevance or other measures (e.g., age).

Example Entity Types

The following Table defines several example entity types in an example embodiment. Other embodiments may incorporate different types.

TABLE 1

Person
Organization
Location
Concept
Event
Product
Condition
Organism
Substance

Example Facets

The following Table defines several example facets in an example embodiment. Other embodiments may incorporate different facets.

TABLE 2

PERSON actor Evri/Person/Entertainment/Actor
PERSON animator Evri/Person/Entertainment/Animator
PERSON cinematographer Evri/Person/Entertainment/Cinematographer
PERSON comedian Evri/Person/Entertainment/Comedian
PERSON fashion_designer Evri/Person/Entertainment/Fashion_Designer
PERSON musician Evri/Person/Entertainment/Musician
PERSON composer Evri/Person/Entertainment/Musician/Composer
PERSON producer Evri/Person/Entertainment/Producer
PERSON director Evri/Person/Entertainment/Director
PERSON radio_personality Evri/Person/Entertainment/Radio_Personality
PERSON television_personality Evri/Person/Entertainment/Television_Personality
PERSON author Evri/Person/Entertainment/Author
PERSON model Evri/Person/Entertainment/Model
PERSON screenwriter Evri/Person/Entertainment/Screenwriter
PERSON playwright Evri/Person/Entertainment/Playwright
PERSON conductor Evri/Person/Entertainment/Conductor
PRODUCT film Evri/Product/Entertainment/Movie
PRODUCT television_show Evri/Product/Entertainment/Television_Show
PRODUCT album Evri/Product/Entertainment/Album
PRODUCT musical Evri/Product/Entertainment/Musical
PRODUCT book Evri/Product/Entertainment/Book
PRODUCT newspaper Evri/Product/Publication
PERSON politician Evri/Person/Politics/Politician
PERSON cabinet_member Evri/Person/Politics/Cabinet_Member
PERSON government_person Evri/Person/Politics/Government_Person
PERSON political_party_leader Evri/Person/Politics/Political_Party_Leader
PERSON judge Evri/Person/Politics/Judge
PERSON country_leader Evri/Person/Politics/Politician/World_Leader
PERSON joint_chiefs_of_staff
Evri/Person/Politics/Politician/Joint_Chiefs_of_Staff
PERSON white_house_staff Evri/Person/Politics/White_House_Staff
PERSON activist Evri/Person/Politics/Activist
PERSON lobbyist Evri/Person/Politics/Lobbyist
PERSON ambassador Evri/Person/Politics/Ambassador
PERSON analyst Evri/Person/Analyst
PERSON journalist Evri/Person/Journalist
PERSON blogger Evri/Person/Blogger
ORGANIZATION band Evri/Organization/Entertainment/Band
ORGANIZATION political_party Evri/Organization/Politics/Political_Party
ORGANIZATION advocacy_group Evri/Organization/Politics/Advocacy_Group
EVENT film_award_ceremony Evri/Event/Entertainment/Film_Award_Ceremony
EVENT music_award_ceremony Evri/Event/Entertainment/Music_Award_Ceremony
EVENT television_award_ceremony Evri/Event/Entertainment/Television_Award_Ceremony
EVENT court_case Evri/Event/Politics/Court_Case
ORGANIZATION television_network
Evri/Organization/Entertainment/Company/Television_Network
ORGANIZATION music_production_company
Evri/Organization/Entertainment/Company/Music_Production_Company
ORGANIZATION film_production_company
Evri/Organization/Entertainment/Company/Film_Production_Company
LOCATION congressional_district Evri/Location/Politics/Congressional_District
LOCATION military_base Evri/Location/Politics/Military_Base
ORGANIZATION congressional_committee Evri/Organization/Politics/Congressional_Committee
ORGANIZATION international_organization
Evri/Organization/Politics/International_Organization
ORGANIZATION government_agency Evri/Organization/Politics/Government_Agency
ORGANIZATION armed_force Evri/Organization/Politics/Armed_Force
ORGANIZATION terrorist_organization
Evri/Organization/Politics/Terrorist_Organization
ORGANIZATION us_court Evri/Organization/Politics/US_Court
ORGANIZATION cabinet_department Evri/Organization/Politics/Cabinet_Department

TABLE 2-continued

LOCATION continent Evri/Location/Continent
LOCATION geographic_region Evri/Location/Geographic_Region
LOCATION country Evri/Location/Country
LOCATION province Evri/Location/Province
LOCATION state Evri/Location/State
LOCATION city Evri/Location/City
LOCATION us_city Evri/Location/City
LOCATION neighborhood Evri/Location/Neighborhood
LOCATION building Evri/Location/Structure/Building
LOCATION island Evri/Location/Island
LOCATION mountain Evri/Location/Mountain
LOCATION body_of_water Evri/Location/Body_of_Water
ORGANIZATION media_companyEvri/Organization/Entertainment/Company/Media_Company
ORGANIZATION haute_couture_house
Evri/Organization/Entertainment/Company/Haute_Couture_House
ORGANIZATION publishing_company
Evri/Organization/Entertainment/Company/Publishing_Company
ORGANIZATION entertainment_company Evri/Organization/Entertainment/Company
CONCEPT fictional_character Evri/Concept/Entertainment/Fictional_Character
PERSON military_leader Evri/Person/Politics/Military_Leader
PERSON military_person Evri/Person/Politics/Military_Person
EVENT military_conflict Evri/Event/Politics/Military_Conflict
PERSON terrorist Evri/Person/Politics/Terrorist
PERSON criminal Evri/Person/Criminal
PERSON explorer Evri/Person/Explorer
PERSON inventor Evri/Person/Technology/Inventor
PERSON lawyer Evri/Person/Lawyer
PERSON artist Evri/Person/Artist
PERSON painter Evri/Person/Artist/Painter
PERSON revolutionary Evri/Person/Revolutionary
PERSON spiritual_leader Evri/Person/Spiritual_Leader
PERSON philosopher Evri/Person/Philosopher
PERSON anthropologist Evri/Person/Anthropologist
PERSON architect Evri/Person/Architect
PERSON historian Evri/Person/Historian
PERSON editor Evri/Person/Editor
PERSON astronaut Evri/Person/Astronaut
PERSON photographer Evri/Person/Photographer
PERSON scientist Evri/Person/Technology/Scientist
PERSON economist Evri/Person/Economist
PERSON technology_person Evri/Person/Technology/Technology_Person
PERSON business_person Evri/Person/Business/Business_Person
PERSON stock_trader Evri/Person/Business/Business_Person/Stock_Trader
PERSON first_lady Evri/Person/Politics/First_Lady
ORGANIZATION us_state_legislature
Evri/Organization/Politics/Legislative_Body/State_Legislature
ORGANIZATION legislative_body Evri/Organization/Politics/Legislative_Body
ORGANIZATION executive_body Evri/Organization/Politics/Executive_Body
PERSON team_owner Evri/Person/Sports/Team_Owner
PERSON sports_announcer Evri/Person/Sports/Sports_Announcer
PERSON sports_executive Evri/Person/Sports/Sports_Executive
PERSON olympic_medalist Evri/Person/Sports/Olympic_Medalist
PERSON athlete Evri/Person/Sports/Athlete
PERSON coach Evri/Person/Sports/Coach
PERSON sports_official Evri/Person/Sports/Sports_Official
PERSON motorcycle_driver Evri/Person/Sports/Athlete/Motorcycle_Rider
PERSON race_car_driver Evri/Person/Sports/Athlete/Race_car_Driver
ORGANIZATION auto_racing_team Evri/Organization/Sports/Auto_Racing_Team
PERSON baseball_player Evri/Person/Sports/Athlete/Baseball_Player
ORGANIZATION baseball_team Evri/Organization/Sports/Baseball_Team
PERSON basketball_player Evri/Person/Sports/Athlete/Basketball_Player
ORGANIZATION basketball_team Evri/Organization/Sports/Basketball_Team
PERSON football_player Evri/Person/Sports/Athlete/Football_Player
ORGANIZATION football_team Evri/Organization/Sports/Football_Team
PERSON hockey_player Evri/Person/Sports/Athlete/Hockey_Player
ORGANIZATION hockey_team Evri/Organization/Sports/Hockey_Team
PERSON soccer_player Evri/Person/Sports/Athlete/Soccer_Player
ORGANIZATION soccer_team Evri/Organization/Sports/Soccer_Team
ORGANIZATION sports_league Evri/Organization/Sports/Sports_League
PERSON cricketer Evri/Person/Sports/Athlete/Cricketer
ORGANIZATION cricket_team Evri/Organization/Sports/Cricket_Team
PERSON cyclist Evri/Person/Sports/Athlete/Cyclist
ORGANIZATION cycling_team Evri/Organization/Sports/Cycling_Team
PERSON volleyball_player Evri/Person/Sports/Athlete/Volleyball_Player
ORGANIZATION volleyball_team Evri/Organization/Sports/Volleyball_Team
PERSON rugby_player Evri/Person/Sports/Athlete/Rugby_Player
ORGANIZATION rugby_team Evri/Organization/Sports/Rugby_Team
PERSON boxer Evri/Person/Sports/Athlete/Boxer
PERSON diver Evri/Person/Sports/Athlete/Diver
PERSON golfer Evri/Person/Sports/Athlete/Golfer

TABLE 2-continued

```
PERSON gymnast Evri/Person/Sports/Athlete/Gymnast
PERSON figure_skater Evri/Person/Sports/Athlete/Figure_Skater
PERSON horse_racing_jockey Evri/Person/Sports/Athlete/Horse_Racing_Jockey
PERSON lacrosse_player Evri/Person/Sports/Athlete/Lacrosse_Player
ORGANIZATION lacrosse_team Evri/Organization/Sports/Lacrosse_Team
PERSON rower Evri/Person/Sports/Athlete/Rower
PERSON swimmer Evri/Person/Sports/Athlete/Swimmer
PERSON tennis_player Evri/Person/Sports/Athlete/Tennis_Player
PERSON track_and_field_athlete Evri/Person/Sports/Athlete/Track_and_Field_Athlete
PERSON wrestler Evri/Person/Sports/Athlete/Wrestler
PERSON triathlete Evri/Person/Sports/Athlete/Triathlete
EVENT sports_competition Evri/Event/Sports/Sports_Event/Sporting_Competition
EVENT sports_event Evri/Event/Sports/Sports_Event
EVENT olympic_sport Evri/Event/Sports/Olympic_Sports
EVENT election Evri/Event/Politics/Election
LOCATION sports_venue Evri/Location/Sports/Sports_Venue
ORGANIZATION sports_division Evri/Organization/Sports/Sports_Division
ORGANIZATION sports_event_promotion_company
    Evri/Organization/Sports/Sports_Event_Promotion_Company
ORGANIZATION sports_organization Evri/Organization/Sports/Sports_Organization
ORGANIZATION company Evri/Organization/Business/Company
ORGANIZATION news_agency Evri/Organization/Business/Company/News_Agency
PRODUCT cell_phone Evri/Product/Technology/Cell_Phone
PRODUCT computer Evri/Product/Technology/Computer
PRODUCT software Evri/Product/Technology/Software
PRODUCT video_game Evri/Product/Technology/Software/Video_Game
PRODUCT video_game_console Evri/Product/Technology/Video_Game_Console
PRODUCT media_player Evri/Product/Technology/Media_player
ORGANIZATION website Evri/Organization/Technology/Website
ORGANIZATION technology_company Evri/Organization/Technology/Company
PRODUCT magazine Evri/Product/Publication
ORGANIZATION financial_services_company
    Evri/Organization/Business/Company/Financial_Services_Company
ORGANIZATION radio_network Evri/Organization/Entertainment/Company/Radio_Network
ORGANIZATION futures_exchange Evri/Organization/Business/Futures_Exchange
ORGANIZATION stock_exchange Evri/Organization/Business/Stock_Exchange
ORGANIZATION government_sponsored_enterprise
    Evri/Organization/Politics/Government_Sponsored_Enterprise
ORGANIZATION political_organization Evri/Organization/Politics/Political_organization
ORGANIZATION labor_union Evri/Organization/Politics/Labor_Union
ORGANIZATION nonprofit_corporation
    Evri/Organization/Business/Company/Nonprofit_Corporation
ORGANIZATION nonprofit_organization Evri/Organization/Nonprofit_Organization
ORGANIZATION national_laboratory Evri/Organization/Politics/National_Laboratory
ORGANIZATION unified_combatant_commands
    Evri/Organization/Politics/Unified_Combatant_Commands
ORGANIZATION research_institute Evri/Organization/Research_Institute
CONCEPT stock_market_index Evri/Concept/Business/Stock_Market_Index
PERSON business_executive Evri/Person/Business/Business_Person/Business_Executive
PERSON corporate_director Evri/Person/Business/Business_Person/Corporate_Director
PERSON banker Evri/Person/Business/Business_Person/Banker
PERSON publisher Evri/Person/Business/Business_Person/Publisher
PERSON us_politician Evri/Person/Politics/U.S._Politician
PERSON nobel_laureate Evri/Person/Nobel_Laureate
PERSON chemist Evri/Person/Chemist
PERSON physicist Evri/Person/Physicist
ORGANIZATION business_organization Evri/Organization/Business/Business_Organization
ORGANIZATION consumer_organization Evri/Organization/Business/Consumer_Organization
ORGANIZATION professional_association Evri/Organization/Business/Professional_Association
PERSON investor Evri/Person/Business/Business_Person/Investor
PERSON financier Evri/Person/Business/Business_Person/Financier
PERSON money_manager Evri/Person/Business/Business_Person/Money_Manager
ORGANIZATION aerospace_company
    Evri/Organization/Business/Company/Aerospace_Company
ORGANIZATION advertising_agency
    Evri/Organization/Business/Company/Advertising_Company
ORGANIZATION agriculture_company
    Evri/Organization/Business/Company/Agriculture_Company
ORGANIZATION airline Evri/Organization/Business/Company/Airline
ORGANIZATION architecture_firm Evri/Organization/Business/Company/Architecture_Firm
ORGANIZATION automotive_company
    Evri/Organization/Business/Company/Automotive_Company
ORGANIZATION chemical_company Evri/Organization/Business/Company/Chemical_Company
ORGANIZATION clothing_company Evri/Organization/Business/Company/Clothing_Company
ORGANIZATION consulting_company
    Evri/Organization/Business/Company/Consulting_Company
ORGANIZATION cosmetics_company
    Evri/Organization/Business/Company/Cosmetics_Company
ORGANIZATION defense_company Evri/Organization/Business/Company/Defense_Company
ORGANIZATION distribution_company
```

TABLE 2-continued

Evri/Organization/Business/Company/Distribution_Company
ORGANIZATION gaming_company Evri/Organization/Business/Company/Gaming_Company
ORGANIZATION electronics_company
Evri/Organization/Business/Company/Electronics_Company
ORGANIZATION energy_company Evri/Organization/Business/Company/Energy_Company
ORGANIZATION hospitality_company
Evri/Organization/Business/Company/Hospitality_Company
ORGANIZATION insurance_company Evri/Organization/Business/Company/Insurance_Company
ORGANIZATION law_firm Evri/Organization/Business/Company/Law_Firm
ORGANIZATION manufacturing_company
Evri/Organization/Business/Company/Manufacturing_Company
ORGANIZATION mining_company Evri/Organization/Business/Company/Mining_Company
ORGANIZATION pharmaceutical_company
Evri/Organization/Business/Company/Pharmaceutical_Company
ORGANIZATION railway_company Evri/Organization/Business/Company/Railway
ORGANIZATION real_estate_company
Evri/Organization/Business/Company/Real_Estate_Company
ORGANIZATION retailer Evri/Organization/Business/Company/Retailer
ORGANIZATION shipping_company Evri/Organization/Business/Company/Shipping_Company
ORGANIZATION software_company
Evri/Organization/Technology/Company/Software_Company
ORGANIZATION steel_company Evri/Organization/Business/Company/Steel_Company
ORGANIZATION telecommunications_company
Evri/Organization/Business/Company/Telecommunications_Company
ORGANIZATION utilities_company Evri/Organization/Business/Company/Utilities_Company
ORGANIZATION wholesaler Evri/Organization/Business/Company/Wholesaler
ORGANIZATION television_production_company
Evri/Organization/Entertainment/Company/Television_Production_Company
ORGANIZATION food_company Evri/Organization/Business/Company/Food_Company
ORGANIZATION beverage_company
Evri/Organization/Business/Company/Food_Company/Beverage_Company
ORGANIZATION restaurant Evri/Organization/Business/Company/Food_Company/Restaurant
ORGANIZATION winery
Evri/Organization/Business/Company/Food_Company/Beverage_Company
EVENT film_festival Evri/Event/Entertainment/Film_Festival
ORGANIZATION film_festival Evri/Event/Entertainment/Film_Festival
PRODUCT anime Evri/Product/Entertainment/Anime
PRODUCT aircraft Evri/Product/Aircraft
PRODUCT military_aircraft Evri/Product/Aircraft/Military_Aircraft
PRODUCT vehicle Evri/Product/Vehicle
PRODUCT ballet Evri/Product/Entertainment/Ballet
PRODUCT opera Evri/Product/Entertainment/Opera
PRODUCT painting Evri/Product/Entertainment/Painting
PRODUCT song Evri/Product/Entertainment/Single
EVENT technology_conference Evri/Event/Technology/Technology_Conference
CONCEPT legislation Evri/Concept/Politics/Legislation
CONCEPT treaty Evri/Concept/Politics/Treaty
ORGANIZATION trade_association Evri/Organization/Business/Trade_Association
ORGANIZATION technology_organization
Evri/Organization/Technology/Technology_Organization
ORGANIZATION educational_institution Evri/Organization/Educational_Institution
LOCATION museum Evri/Location/Structure/Building/Museum
LOCATION religious_building Evri/Location/Structure/Building/Religious_Building
PERSON astronomer Evri/Person/Astronomer
PERSON mathematician Evri/Person/Mathematician
PERSON academic Evri/Person/Academic
PERSON dancer Evri/Person/Entertainment/Dancer
PRODUCT play Evri/Product/Entertainment/Play
LOCATION botanical_garden Evri/Location/Botanical_Garden
LOCATION hospital Evri/Location/Health/Hospital
PERSON psychiatrist Evri/Person/Health/Psychiatrist
PERSON physician Evri/Person/Health/Physician
PERSON nurse Evri/Person/Health/Nurse
ORGANIZATION journalism_organization Evri/Organization/Journalism_Organization
ORGANIZATION healthcare_company
Evri/Organization/Business/Company/Healthcare_Company
ORGANIZATION religious_organization Evri/Organization/Religious_Organization
PERSON biologist Evri/Person/Scientist/Biologist
PERSON biochemist Evri/Person/Scientist/Biochemist
PERSON botanist Evri/Person/Scientist/Botanist
PERSON poet Evri/Person/Entertainment/Author/Poet
PERSON curler Evri/Person/Sports/Athlete/Curler
PERSON biathlete Evri/Person/Sports/Athlete/Biathlete
PERSON alpine_skier Evri/Person/Sports/Athlete/Alpine_Skier
PERSON cross-country_skier Evri/Person/Sports/Athlete/Cross-country_Skier
PERSON freestyle_skier Evri/Person/Sports/Athlete/Freestyle_Skier
PERSON luger Evri/Person/Sports/Athlete/Luger
PERSON nordic_combined_skier Evri/Person/Sports/Athlete/Nordic_Combined_Skier
PERSON speed_skater Evri/Person/Sports/Athlete/Speed_Skater
PERSON skeleton_racer Evri/Person/Sports/Athlete/Skeleton_Racer TABLE 2-continued

```
PERSON ski_jumper Evri/Person/Sports/Athlete/Ski_Jumper
PERSON snowboarder Evri/Person/Sports/Athlete/Snowboarder
PERSON bobsledder Evri/Person/Sports/Athlete/Bobsledder
PERSON bodybuilder Evri/Person/Sports/Athlete/Bodybuilder
PERSON equestrian Evri/Person/Sports/Athlete/Equestrian
PERSON fencer Evri/Person/Sports/Athlete/Fencer
PERSON hurler Evri/Person/Sports/Athlete/Hurler
PERSON martial_artist Evri/Person/Sports/Athlete/Martial_Artist
PERSON canoer Evri/Person/Sports/Athlete/Canoer
LOCATION music_venue Evri/Location/Entertainment/Music_Venue
LOCATION aquarium Evri/Location/Aquarium
LOCATION cemetery Evri/Location/Cemetery
LOCATION national_park Evri/Location/National_Park
LOCATION volcano Evri/Location/Volcano
LOCATION zoo Evri/Location/Zoo
LOCATION structure Evri/Location/Structure
LOCATION airport Evri/Location/Structure/Airport
LOCATION bridge Evri/Location/Structure/Bridge
LOCATION hotel Evri/Location/Structure/Hotel
LOCATION palace Evri/Location/Structure/Palace
LOCATION monument Evri/Location/Structure/Monument
LOCATION street Evri/Location/Street
LOCATION amusement_park Evri/Location/Amusement_Park
LOCATION unitary_authority Evri/Location/Unitary_Authority
PRODUCT drug_brand Evri/Product/Health/Drug_Brand
PRODUCT weapon Evri/Product/Weapon
PRODUCT missile_system Evri/Product/Weapon/Missile_System
PRODUCT firearm Evri/Product/Weapon/Firearm
PRODUCT artillery Evri/Product/Weapon/Artillery
PRODUCT anti-aircraft_weapon Evri/Product/Weapon/Anti-aircraft_Weapon
PRODUCT anti-tank_weapon Evri/Product/Weapon/Anti-tank_Weapon
PRODUCT biological_weapon Evri/Product/Weapon/Biological_Weapon
PRODUCT chemical_weapon Evri/Product/Weapon/Chemical_Weapon
CHEMICAL chemical_weapon Evri/Product/Weapon/Chemical_Weapon
SUBSTANCE chemical_weapon Evri/Product/Weapon/Chemical_Weapon
PRODUCT explosive Evri/Product/Weapon/Explosive
PRODUCT weapons_launcher Evri/Product/Weapon/Weapons_Launcher
PERSON chess_player Evri/Person/Chess_Player
PERSON sculptor Evri/Person/Artist/Sculptor
PRODUCT game Evri/Product/Game
ORGANIZATION theater_company
Evri/Organization/Entertainment/Company/Theater_Company
PERSON badminton_player Evri/Person/Sports/Athlete/Badminton_Player
PRODUCT naval_ship Evri/Product/Watercraft/Naval_Ship
PRODUCT battleship Evri/Product/Watercraft/Naval_Ship/Battleship
PRODUCT cruiser Evri/Product/Watercraft/Naval_Ship/Cruiser
PRODUCT aircraft_carrier Evri/Product/Watercraft/Naval_Ship/Aircraft_Carrier
PRODUCT destroyer Evri/Product/Watercraft/Naval_Ship/Destroyer
PRODUCT frigate Evri/Product/Watercraft/Naval_Ship/Frigate
PRODUCT submarine Evri/Product/Watercraft/Naval_Ship/Submarine
PRODUCT cruise_ship Evri/Product/Watercraft/Cruise_Ship
PRODUCT yacht Evri/Product/Watercraft/Yacht
PRODUCT ocean_liner Evri/Product/Watercraft/Ocean_Liner
LOCATION county Evri/Location/County
PRODUCT symphony Evri/Product/Entertainment/Symphony
ORGANIZATION television_station
Evri/Organization/Entertainment/Company/Television_Station
ORGANIZATION radio_station Evri/Organization/Entertainment/Company/Radio_Station
CONCEPT constitutional_amendment Evri/Concept/Politics/Constitutional_Amendment
PERSON australian_rules_footballer Evri/Person/Sports/Athlete/Australian_Rules_Footballer
ORGANIZATION australian_rules_football_team
Evri/Organization/Sports/Australian_Rules_Football_Team
ORGANIZATION criminal_organization Evri/Organization/Criminal_Organization
PERSON poker_player Evri/Person/Poker_Player
PERSON bowler Evri/Person/Sports/Athlete/Bowler
PERSON yacht_racer Evri/Person/Sports/Athlete/Yacht_Racer
PERSON water_polo_player Evri/Person/Sports/Athlete/Water_Polo_Player
PERSON field_hockey_player Evri/Person/Sports/Athlete/Field_Hockey_Player
PERSON skateboarder Evri/Person/Sports/Athlete/Skateboarder
PERSON polo_player Evri/Person/Sports/Athlete/Polo_Player
PERSON gaelic_footballer Evri/Person/Sports/Athlete/Gaelic_Footballer
PRODUCT programming_language Evri/Product/Technology/Programming_Language
PERSON engineer Evri/Person/Technology/Engineer
EVENT cybercrime Evri/Event/Technology/Cybercrime
EVENT criminal_act Evri/Event/Criminal_Act
PERSON critic Evri/Person/Critic
PERSON pool_player Evri/Person/Pool_Player
PERSON snooker_player Evri/Person/Snooker_Player
PERSON competitive_eater Evri/Person/Competitive_Eater
PRODUCT data_storage_medium Evri/Product/Technology/Data_Storage_Medium
```

TABLE 2-continued

```
PRODUCT data_storage_device Evri/Product/Technology/Data_Storage_Device
PERSON mountain_climber Evri/Person/Mountain_Climber
PERSON aviator Evri/Person/Aviator
ORGANIZATION cooperative Evri/Organization/Cooperative
CONCEPT copyright_license Evri/Concept/Copyright_License
EVENT observance Evri/Event/Observance
PERSON outdoor_sportsperson Evri/Person/Sports/Outdoor_Sportsperson
PERSON rodeo_performer Evri/Person/Sports/Rodeo_Performer
PERSON sports_shooter Evri/Person/Sports/Athlete/Sports_Shooter
CONCEPT award Evri/Concept/Award
CONCEPT entertainment_series Evri/Concept/Entertainment/Entertainment_Series
PERSON chef Evri/Person/Chef
PERSON cartoonist Evri/Person/Entertainment/Cartoonist
PERSON comics_creator Evri/Person/Entertainment/Comics_Creator
PERSON nobility Evri/Person/Nobility
PERSON porn_star Evri/Person/Porn_Star
PERSON archaeologist Evri/Person/Scientist/Archaeologist
PERSON paleontologist Evri/Person/Scientist/Paleontologist
PERSON victim_of_crime Evri/Person/Victim_of_Crime
LOCATION region Evri/Location/Region
PERSON linguist Evri/Person/Linguist
PERSON librarian Evri/Person/Librarian
PERSON bridge_player Evri/Person/Bridge_Player
PERSON choreographer Evri/Person/Entertainment/Choreographer
PRODUCT camera Evri/Product/Technology/Camera
PRODUCT publication Evri/Product/Publication
PRODUCT comic Evri/Product/Entertainment/Comic
PRODUCT short_story Evri/Product/Entertainment/Short_Story
ORGANIZATION irregular_military_organization
  Evri/Organization/Irregular_Military_Organization
SUBSTANCE chemical_element Evri/Substance/Chemical_Element
SUBSTANCE alkaloid Evri/Substance/Organic_Compound/Alkaloid
SUBSTANCE glycoside Evri/Substance/Glycoside
SUBSTANCE amino_acid Evri/Substance/Amino_Acid
SUBSTANCE protein Evri/Substance/Protein
SUBSTANCE enzyme Evri/Substance/Enzyme
SUBSTANCE hormone Evri/Substance/Hormone
SUBSTANCE hydrocarbon Evri/Substance/Organic_Compound/Hydrocarbon
SUBSTANCE inorganic_compound Evri/Substance/Inorganic_Compound
SUBSTANCE lipid Evri/Substance/Organic_Compound/Lipid
SUBSTANCE steroid Evri/Substance/Organic_Compound/Lipid/Steroid
SUBSTANCE molecule Evri/Substance/Molecule
SUBSTANCE polymer Evri/Substance/Molecule/Polymer
SUBSTANCE terpene Evri/Substance/Organic_Compound/Terpene
SUBSTANCE toxin Evri/Substance/Toxin
SUBSTANCE antibiotic Evri/Substance/Health/Antibiotic
SUBSTANCE antioxidant Evri/Substance/Health/Antioxidant
SUBSTANCE anti-inflammatory Evri/Substance/Health/Anti-inflammatory
SUBSTANCE antiasthmatic_drug Evri/Substance/Health/Antiasthmatic_drug
SUBSTANCE anticonvulsant Evri/Substance/Health/Anticonvulsant
SUBSTANCE antihistamine Evri/Substance/Health/Antihistamine
SUBSTANCE antihypertensive Evri/Substance/Health/Antihypertensive
SUBSTANCE antiviral Evri/Substance/Health/Antiviral
SUBSTANCE painkiller Evri/Substance/Health/Painkiller
SUBSTANCE Painkiller Evri/Substance/Health/Painkiller
SUBSTANCE anesthetic Evri/Substance/Health/Anesthetic
SUBSTANCE antibody Evri/Substance/Antibody
SUBSTANCE chemotherapeutic_drug Evri/Substance/Health/Chemotherapeutic
SUBSTANCE anti-diabetic_drug Evri/Substance/Health/Anti-diabetic
SUBSTANCE antianginal_drug Evri/Substance/Health/Antianginal
SUBSTANCE muscle_relaxant Evri/Substance/Health/Muscle_relaxant
SUBSTANCE hypolipidemic_drug Evri/Substance/Health/Hypolipidemic_Drug
SUBSTANCE psychoactive_drug Evri/Substance/Health/Psychoactive_Drug
SUBSTANCE vaccine Evri/Substance/Health/Vaccine
SUBSTANCE gastrointestinal_drug Evri/Substance/Health/Gastrointestinal_Drug
SUBSTANCE erectile_dysfunction_drug Evri/Substance/Health/Erectile_Dysfunction_Drug
SUBSTANCE organometallic_compound
  Evri/Substance/Organic_Compound/Organometallic_Compound
SUBSTANCE phenol Evri/Substance/Organic_Compound/Phenol
SUBSTANCE ketone Evri/Substance/Organic_Compound/Ketone
SUBSTANCE amide Evri/Substance/Organic_Compound/Amide
SUBSTANCE ester Evri/Substance/Organic_Compound/Ester
SUBSTANCE ether Evri/Substance/Organic_Compound/Ether
SUBSTANCE heterocyclic_compound
  Evri/Substance/Organic_Compound/Heterocyclic_Compound
SUBSTANCE organic_compound Evri/Substance/Organic_Compound
SUBSTANCE carbohydrate Evri/Substance/Organic_Compound/Carbohydrate
SUBSTANCE peptide Evri/Substance/Organic_Compound/Peptide
SUBSTANCE organohalide Evri/Substance/Organic_Compound/Organohalide
SUBSTANCE organosulfur_compound
```

TABLE 2-continued

```
Evri/Substance/Organic_Compound/Organosulfur_Compound
SUBSTANCE aromatic_compound Evri/Substance/Organic_Compound/Aromatic_Compound
SUBSTANCE carboxylic_acid Evri/Substance/Organic_Compound/Carboxylic_Acid
SUBSTANCE nucleic_acid Evri/Substance/Nucleic_Acid
SUBSTANCE ion Evri/Substance/Ion
ORGANISM cyanobacterium Evri/Organism/Health/Cyanobacterium
ORGANISM gram-positive_bacterium Evri/Organism/Health/Gram-positive_Bacterium
ORGANISM gram-negative_bacterium Evri/Organism/Health/Gram-negative_Bacterium
ORGANISM acid-fast_bacterium Evri/Organism/Health/Acid-fast_Bacterium
ORGANISM dna_virus Evri/Organism/Health/DNA_Virus
ORGANISM rna_virus Evri/Organism/Health/RNA_Virus
CONDITION symptom Evri/Condition/Health/Symptom
CONDITION injury Evri/Condition/Health/Injury
CONDITION inflammation Evri/Condition/Health/Inflammation
CONDITION disease Evri/Condition/Health/Disease
CONDITION cancer Evri/Condition/Health/Disease/Cancer
ORGANISM medicinal_plant Evri/Organism/Health/Medicinal_Plant
ORGANISM poisonous_plant Evri/Organism/Poisonous_Plant
ORGANISM herb Evri/Organism/Herb
CONCEPT medical_procedure Evri/Concept/Health/Medical_Procedure
ORGANISM bacterium Evri/Organism/Health/Bacterium
ORGANISM virus Evri/Organism/Health/Virus
ORGANISM horse Evri/Organism/Horse
PERSON fugitive Evri/Person/Fugitive
ORGANIZATION military_unit Evri/Organization/Politics/Military_Unit
ORGANIZATION law_enforcement_agency
Evri/Organization/Politics/Law_Enforcement_Agency
LOCATION golf_course Evri/Location/Golf_Course
PERSON law_enforcement_agent Evri/Person/Politics/Law_Enforcement_Agent
PERSON magician Evri/Person/Entertainment/Magician
LOCATION educational_institution Evri/Organization/Educational_Institution
CONCEPT social_program Evri/Concept/Politics/Social_Program
EVENT international_conference Evri/Event/Politics/International_Conference
```

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/469,360, entitled "CLUSTER-BASED IDENTIFICATION OF NEWS STORIES," filed Mar. 30, 2011; U.S. Pat. No. 7,526,425, filed Dec. 13, 2004, entitled "METHOD AND SYSTEM FOR EXTENDING KEYWORD SEARCHING FOR SYNTACTICALLY AND SEMANTICALLY ANNOTATED DATA" issued on Apr. 28, 2009; U.S. patent application Ser. No. 12/288,158, filed Oct. 15, 2008, entitled "NLP-BASED ENTITY RECOGNITION AND DISAMBIGUATION;" and U.S. Patent Application No. 61/256,851, filed Oct. 30, 2009, entitled "IMPROVED KEYWORD-BASED SEARCH ENGINE RESULTS USING ENHANCED QUERY STRATEGIES" are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for news story recommendation are applicable to other architectures. For example, news stories may be identified, customized, and presented within the context of mobile applications (e.g., "apps") that execute on smart phones or tablet computers. Also, the methods, techniques, and systems discussed herein are applicable to differing query languages, protocols, communication media (optical, wireless, cable, etc.) and devices (e.g., desktop computers wireless handsets, electronic organizers, personal digital assistants, portable email machines, game machines, pagers, navigation devices such as GPS receivers, etc.).

The invention claimed is:

1. A method in a content recommendation system, the method comprising:
    identifying a news story about an event, the news story including multiple related content items that each give an account of the event and that each reference multiple entities or categories that are each electronically represented by the content recommendation system, comprising:
        processing content items to determine semantic information that includes identified entities and relations between the identified entities;
        storing the identified entities and relations in a repository of the content recommendation system;
        generating a cluster that includes the multiple related content items, based at least in part on how many entities each of the multiple related content items has in common with one or more other of the multiple related content items, wherein generating the cluster includes:
            finding a candidate cluster of a plurality of clusters that is nearest to one of the multiple related content items by computing a cosine distance between a term vector that represents the one content item and a term vector that represents a content item of the candidate cluster; and
            determining whether the candidate cluster is a suitable cluster for the one content item, based on all of: cosine distances between the one content item and content items of the candidate cluster, a quantity of common keyterms between the one content item and content items of the candidate cluster, and on whether a sufficiently high percentage of content items of the candidate cluster have a cosine distance to the content item that is below a predetermined threshold;

if the candidate cluster is determined to be a suitable cluster, adding the one content item to the candidate cluster; and if the candidate cluster is not determined to be a suitable cluster, creating a new cluster that includes the one content item as a seed; and storing an indication of the identified news story and the generated cluster.

2. The method of claim 1 wherein finding the candidate cluster that is nearest to one of the multiple related content items includes comparing the one content item to content items of the candidate cluster.

3. The method of claim 1 wherein finding the candidate cluster that is nearest to one of the multiple related content items includes comparing the one content item to a centroid of the candidate cluster.

4. The method of claim 1 wherein finding the candidate cluster includes computing a cosine distance between a term vector that represents the one content item and a term vector that represents a content item of the candidate cluster.

5. The method of claim 1 wherein finding the candidate cluster includes finding a cluster that includes a content item that has a cosine distance to the one content item that is lower than cosine distances between the one content item and other content items of other clusters.

6. The method of claim 1 wherein identifying the news story includes processing only content items published during a time interval that is about one day in length.

7. The method of claim 1 wherein identifying the news story includes reassigning content items from clusters that are smaller than a specified size to clusters that are larger than the specified size.

8. The method of claim 1 wherein identifying the news story includes merging two clusters into a single cluster when distances between centroids of the two clusters are lower than a specified threshold.

9. The method of claim 1 wherein identifying the news story includes generating two or more sub-clusters of the generated cluster, each sub-cluster including one or more of the multiple related content items.

10. The method of claim 9 wherein generating the two or more sub-clusters includes decomposing the multiple content items using a k-means process.

11. The method of claim 9 wherein generating the two or more sub-clusters includes discarding a candidate sub-cluster if a distance measured between a centroid of the generated cluster and a centroid of the candidate sub-cluster is lower than a specified threshold.

12. The method of claim 9 wherein generating the two or more sub-clusters includes retaining a candidate sub-cluster if a distance measured between a centroid of the generated cluster and a centroid of the candidate sub-cluster is greater than a specified threshold.

13. The method of claim 1 wherein identifying the news story includes determining a representative content item for the news story by selecting one of the multiple related content items that is nearest to a centroid of the generated cluster.

14. The method of claim 1 wherein storing the indication of the identified news story and the generated cluster includes storing an association between a keyterm, entity, or category and the generated cluster, along with an indicator of relevance of the keyterm, entity, or category to the generated cluster.

15. The method of claim 1 wherein storing the indication of the identified news story and the generated cluster includes storing one or more of: a representative content item for the identified news story; a representative image for the identified news story; a centroid of the generated cluster, the centroid including a vector of keyterms and/or entity identifiers; top categories for the identified news story; two or more sub-clusters for the identified news story; a growth rate of the generated cluster; and a date.

16. The method of claim 1, further comprising:
receiving a search query that includes an indication of a keyterm, entity or category;
selecting a news story from a plurality of news stories, the selecting based on how many keyterms, entities, or categories are in common between the received search query and the multiple content items of the selected news story; and
transmitting an indication of the selected news story.

17. The method of claim 16, further comprising:
selecting multiple news stories that are each relevant to the received search query; and
sorting the multiple selected news stories based on one or more of: the number of content items in each news story, a rate of growth of the number of content items in each news story, an importance of the indicated keyterm, entity, or category to content items in each news story, an age of each news story.

18. The method of claim 1, wherein processing the content items to determine semantic information includes determining keyterms, entities, and categories referenced by the content items, wherein the entities and categories are represented in a taxonomic hierarchy that is a graph of nodes connected to one another by links, wherein each node represents an entity or a category, and wherein each link represents a relation between a first entity or category and a second entity or category.

19. A computing system configured to recommend content, comprising:
a memory;
a module stored on the memory that is configured, when executed, to identify a news story about an event, the news story including multiple related content items that each give an account of the event and that each reference multiple entities or categories that are each electronically represented by the content recommendation system, by:
processing content items to determine semantic information that includes identified entities and relations between the identified entities;
storing the identified entities and relations in a repository of the content recommendation system;
generating a cluster that includes the multiple related content items, based at least in part on how many entities each of the multiple related content items has in common with one or more other of the multiple related content items, wherein generating the cluster includes:
finding a candidate cluster of a plurality of clusters that is nearest to one of the multiple related content items by computing a cosine distance between a term vector that represents the one content item and a term vector that represents a content item of the candidate cluster;
determining whether the candidate cluster is a suitable cluster for the one content item, based on all of: cosine distances between the one content item and content items of the candidate cluster, a quantity of common keyterms between the one content item and content items of the candidate cluster, and on whether a sufficiently high percentage of content items of the candidate cluster have a cosine distance to the content item that is below a predetermined threshold;

if the candidate cluster is determined to be a suitable cluster, adding the one content item to the candidate cluster; and if the candidate cluster is not determined to be a suitable cluster, creating a new cluster that includes the one content item as a seed; and storing an indication of the identified news story and the generated cluster.

20. The computing system of claim 19 wherein the computing system is a mobile computing device and the module is a content recommendation module.

21. The computing system of claim 19 wherein the module is configured to recommend news stories to at least one of a personal digital assistant, a smart phone, a laptop computer, a tablet computer, and/or a third-party application.

\* \* \* \* \*